(12) United States Patent
Sun et al.

(10) Patent No.: US 11,032,214 B2
(45) Date of Patent: Jun. 8, 2021

(54) METHOD, APPARATUS, AND SYSTEM FOR MANAGING NETWORK SLICE INSTANCE

(71) Applicant: HUAWEI TECHNOLOGIES CO., LTD., Guangdong (CN)

(72) Inventors: Wenqi Sun, Shenzhen (CN); Shuigen Yang, Shanghai (CN); Wei Lu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 58 days.

(21) Appl. No.: 16/400,687

(22) Filed: May 1, 2019

(65) Prior Publication Data

US 2019/0260690 A1 Aug. 22, 2019

Related U.S. Application Data

(63) Continuation of application No. PCT/CN2017/107963, filed on Oct. 27, 2017.

(30) Foreign Application Priority Data

Nov. 3, 2016 (CN) .......................... 201610974264.6

(51) Int. Cl.
*G06F 15/177* (2006.01)
*H04L 12/911* (2013.01)
(Continued)

(52) U.S. Cl.
CPC ........ *H04L 47/827* (2013.01); *G06F 9/45558* (2013.01); *H04L 41/0806* (2013.01);
(Continued)

(58) Field of Classification Search
None
See application file for complete search history.

(56) References Cited

U.S. PATENT DOCUMENTS 8,484,355 B1 * 7/2013 Lochhead ............. G06F 9/5072
709/226
8,893,009 B2 * 11/2014 Raleigh ................ H04M 15/58
715/736

(Continued)

FOREIGN PATENT DOCUMENTS

CN 105429780 A 3/2016
CN 105813195 A 7/2016
(Continued)

OTHER PUBLICATIONS

"3rd Generation Partnership Project; Technical Specification Group Services and System Aspects; Study on Architecture for Next Generation System (Release 14)," 3GPP TR 23.799 V1.1.0, Oct. 2016, 501 pages.

(Continued)

*Primary Examiner* — Phuoc H Nguyen
(74) *Attorney, Agent, or Firm* — Slater Matsil, LLP

(57) ABSTRACT

Embodiments of this application provide a method, an apparatus, and a system for managing a network slice instance. The method includes: receiving, by a first network device, a network slice instance creation request from a transmit end device, to request to create a target network slice instance; sending, by the first network device, network function configuration indication information to a second network device based on the description information, to instruct the second network device to configure a network function of the target network slice instance; receiving, by the first network device, network function configuration response information sent by the second network device, to indicate that the configuration of the network function of the target network slice instance is completed; and sending, by the first network device, network slice instance creation response information to the transmit end device.

20 Claims, 14 Drawing Sheets

(51) Int. Cl.
- *H04L 12/813* (2013.01)
- *H04L 12/815* (2013.01)
- *H04L 12/851* (2013.01)
- *H04L 12/801* (2013.01)
- *H04W 28/16* (2009.01)
- *H04L 12/24* (2006.01)
- *H04W 16/02* (2009.01)
- *G06F 9/455* (2018.01)

(52) U.S. Cl.
CPC .............. *H04L 41/12* (2013.01); *H04L 47/20* (2013.01); *H04L 47/225* (2013.01); *H04L 47/2425* (2013.01); *H04L 47/29* (2013.01); *H04W 16/02* (2013.01); *H04W 28/16* (2013.01); *G06F 2009/45595* (2013.01)

(56) References Cited

U.S. PATENT DOCUMENTS

| | | | | |
|---|---|---|---|---|
| 10,149,193 | B2* | 12/2018 | Cui | H04W 28/0231 |
| 10,225,323 | B2* | 3/2019 | Revanuru | H04L 67/10 |
| 10,454,836 | B2* | 10/2019 | Shaw | H04L 47/24 |
| 2008/0244579 | A1* | 10/2008 | Muller | G06F 9/5016 718/100 |
| 2009/0205046 | A1 | 8/2009 | Radosavac et al. | |
| 2011/0296018 | A1* | 12/2011 | Deng | H04L 67/306 709/226 |
| 2014/0075032 | A1* | 3/2014 | Vasudevan | H04L 41/5048 709/226 |
| 2015/0081837 | A1* | 3/2015 | Bernier | H04W 4/50 709/217 |
| 2017/0142591 | A1* | 5/2017 | Vrzic | H04W 76/11 |
| 2017/0339688 | A1* | 11/2017 | Singh | H04W 76/11 |
| 2019/0082490 | A1 | 3/2019 | Zhang et al. | |

FOREIGN PATENT DOCUMENTS

| | | |
|---|---|---|
| CN | 105898894 A | 8/2016 |
| CN | 106060900 A | 10/2016 |

OTHER PUBLICATIONS

"3rd Generation Partnership Project; Technical Specification Group Services and System Aspects; Telecommunication management; Study on management and orchestration of network slicing for next generation network (Release 14)," 3GPP TR 28.801, V0.2.0, Sep. 2016, 36 pages.

Hewlett Packard, "Single Domain Network Slicing use case—Clause 6.2.2", NFVEVE(16)0000154r1, European Telecommunications Standards Institute (ETSI), 4 pages, Sep. 6, 2016, XP014278376.

ZTE, "NextGen Core Architecture solution for sharing Network Function across multiple Network Slices", SA WG2 Meeting #114, Apr. 11-15, 2016, S2-16xxxx, 6 Pages, XP051086379, Sophia Antipolis.

Yang, X. et al., "Initial Anaylsis of 5G Mobile Network Slicing Technology," Designing Techniques of Posts and Telecommunications, 2016, 4 pages.

International Search Report dated Feb. 2, 2018 in corresponding International Application No. PCT/CN2017/107963.

* cited by examiner

METHOD, APPARATUS, AND SYSTEM FOR MANAGING NETWORK SLICE INSTANCE

CROSS-REFERENCE TO RELATED APPLICATIONS

This application is a continuation of International Application No. PCT/CN2017/107963, filed on Oct. 27, 2017, which claims priority to Chinese Patent Application No. 201610974264.6, filed on Nov. 3, 2016. The disclosures of the aforementioned applications are hereby incorporated by reference in their entireties.

TECHNICAL FIELD

This application relates to the communications field, and in particular, to a method, an apparatus, and a system for managing a network slice instance.

BACKGROUND

With rapid development of mobile communications, future mobile communications systems need to meet a wide variety of service requirements, such as enhanced mobile broadband, massive machine type communications, and ultra-reliable and low latency communications. Therefore, the concept of network slicing is proposed in a next generation mobile communications system. A network slicing technology refers to logical abstraction of a network into one or more network slices. Each network slice includes a series of logical network functions, and one network slice can meet a connection and communication service requirement of a particular class or a use case. The next generation mobile communications system may include a large quantity of network slices that satisfy different connection capabilities.

Although network function virtualization is a key enabling technology for reducing implementation complexity and costs of network slices, physical network elements and virtualized network elements may coexist for a long time and flexibly form network slices for the purpose of reducing deployment costs and recouping investment. Therefore, to quickly and flexibly provide differentiated communication requirements, operators need an automated slicing operation and maintenance system that can manage and orchestrate both a physical network function and a virtualized network function. However, in a network management architecture (for example, the 3rd Generation Partnership Project (3rd Generation Partnership Project, 3GPP) telecommunications network management architecture) in the prior art, a network slice cannot be flexibly managed or orchestrated.

SUMMARY

Embodiments of this application provide a method, an apparatus, and a system for managing a network slice instance, to manage a network slice instance.

According to a first aspect, a method for managing a network slice instance is provided. The method includes the following steps: receiving, by a first network device, a network slice instance creation request from a transmit end device, where the network slice instance creation request is used to request to create a target network slice instance, and the network slice instance creation request includes description information of the target network slice instance; sending, by the first network device, network function configuration indication information to a second network device based on the description information, where the network function configuration indication information is used to instruct the second network device to configure a network function of the target network slice instance; receiving, by the first network device, network function configuration response information sent by the second network device, where the network function configuration response information indicates that the configuration of the network function of the target network slice instance is completed; and sending, by the first network device, network slice instance creation response information to the transmit end device, where the network slice instance creation response information indicates that the creation of the target network slice instance is completed.

In this embodiment of this application, the first network device instructs the second network device to configure the network function of the network slice instance, to manage a process of creating the network slice instance, thereby automatically creating the network slice instance, and improving efficiency of managing the network slice instance.

It should be understood that, the transmit end may be an operator, a third-party client, an application related to a service, or any entity that may send a request to an NSM&O in a service provider domain. This is not limited in this embodiment of this application.

In a possible implementation, the network function of the target network slice instance includes at least one of the following network functions: a physical network function and a virtualized network function.

In this embodiment of this application, the network function included in the network slice instance may be a physical network function, may be a virtualized network function, or includes both a physical network function and a virtualized network function, so that the network function of the network slice instance can be flexibly orchestrated and managed as required.

In a possible implementation, when the network function of the target network slice instance includes a sharable network function, the network function configuration indication information includes an identifier of the target network slice instance.

In a possible implementation, when the network function of the target network slice instance includes a sharable network function, the method further includes: sending, by the first network device, a network resource extension indication to a fourth network device, where the network resource extension indication is used to instruct the fourth network device to allocate a network resource to the shared network function of the target network slice instance.

In a possible implementation, the method further includes: sending, by the first network device, resource reservation indication information to the fourth network device, where the resource reservation indication information is used to instruct the fourth network device to reserve a network resource for the target network slice instance.

In a possible implementation, when the network function of the target network slice instance includes a virtualized network function, the method further includes: sending, by the first network device, a virtualized network function creation request to a third network device, where the virtualized network function creation request is used to instruct the third network device to create the virtualized network function of the target network slice instance; and receiving, by the first network device, virtualized network function creation response information sent by the third network device, where the virtualized network function creation response information indicates that the creation of the virtualized network function of the target network slice instance is completed.

In a possible implementation, the method further includes: sending, by the first network device, a resource allocation request to the fourth network device, where the resource allocation request is used to request the fourth network device to allocate a network resource corresponding to the virtualized network function to the target network slice instance; and receiving, by the first network device, resource allocation response information sent by the fourth network device, where the resource allocation response information is used to indicate that the allocation of the network resource corresponding to the virtualized network function of the target network slice instance is completed.

In a possible implementation, after the receiving, by the first network device, resource allocation response information sent by the fourth network device, the method further includes: sending, by the first network device, resource allocation acknowledgement information to the third network device, where the resource allocation acknowledgement information is used to indicate that the allocation of the network resource corresponding to the virtualized network function of the target network slice instance is completed.

In a possible implementation, before the sending, by the first network device, a resource allocation request to the fourth network device, the method further includes: receiving, by the first network device, information indicating allowed resource allocation and sent by the third network device, where the information indicating allowed resource allocation is used to indicate that the third network device is allowed to allocate the network resource corresponding to the virtualized network function to the target network slice instance.

In a possible implementation, the method further includes: sending, by the first network device, network function notification information to a fifth network device, where the network function notification information is used to indicate a network function to be configured by the first network device.

In a possible implementation, the method further includes: receiving, by the first network device, network function response information sent by the fifth network device, where the network function response information is used to indicate that the fifth network device already determines the network function to be configured by the first network device.

In a possible implementation, the method further includes: sending, by the first network device, network function query information to the fifth network device, where the network function query information is used to request to query for a network function that is already generated by the fifth network device; and receiving, by the first network device, network function feedback information sent by the fifth network device, where the network function feedback information is used to indicate the network function that is already generated by the fifth network device.

In a possible implementation, the description information includes at least one of the following information: description information of a service requirement of the target network slice instance and configuration parameter information of a network slice template of the target network slice instance.

In a possible implementation, the method further includes: sending, by the first network device, validity check information to a storage device, where the validity check information is used to request to query whether the network slice instance creation request is valid; receiving, by the first network device, validity check response information sent by the storage device, where the validity check response information is used to indicate whether the network slice instance creation request is valid; and the sending, by the first network device, network function configuration indication information to a second network device based on the description information includes: when the validity check response information indicates that the network slice instance creation request is valid, sending, by the first network device, the network function configuration indication information to the second network device based on the description information.

In a possible implementation, after the receiving, by the first network device, network function configuration response information sent by the second network device, the method further includes: sending, by the first network device, a network slice instance activation indication to the storage device, where the target network slice instance is set to an active state based on the network slice instance activation indication.

In a possible implementation, the method further includes: sending, by the first network device, a network function port activation indication to the second network device, where the network function port activation indication is used to activate a port for the network function of the target network slice instance.

In a possible implementation, the method further includes: sending, by the first network device, a network slice instance update indication to the storage device, where the network slice instance update indication is used to instruct to store the parameter information of the target network slice instance into the storage device.

According to a second aspect, another method for managing a network slice instance is provided. The method includes: receiving, by a second network device, network slice configuration information sent by a first network device, where the network slice configuration information is used to instruct the second network device to configure a network function of a target network slice; and sending, by the second network device, network slice configuration response information to the first network device, where the network slice configuration response information indicates that the configuration of the network function corresponding to the target network slice is completed.

In this embodiment of this application, the second network device receives an indication of the first network device and configures the network function of the network slice instance, to manage a process of creating the network slice instance, thereby automatically creating the network slice instance, and improving efficiency of managing the network slice instance.

In a possible implementation, the network function of the target network slice includes at least one of the following network functions: a physical network function and a virtualized network function.

In a possible implementation, the method further includes: receiving, by the second network device, a network function port activation indication sent by the first network device, where the network function port activation indication is used to instruct to activate a port for the network function of the target network slice instance.

In a possible implementation, the method further includes: receiving, by the second network device, a virtualized network function addition request sent by a third network device, where the virtualized network function addition request is used to request to add the virtualized network function of the target network slice instance.

According to a third aspect, a method for managing a network slice instance is provided. The method includes: receiving, by a third network device, a virtualized network function creation request sent by a first network device, where the virtualized network function creation request is used to instruct the third network device to create a virtualized network function of a target network slice instance; and sending, by the third network device, virtualized network function creation response information to the first network device, where the virtualized network function creation response information indicates that the creation of the virtualized network function of the target network slice instance is completed.

In this embodiment of this application, the third network device receives an indication of the first network device, to manage a process of creating the network slice instance, thereby automatically creating the network slice instance, and improving efficiency of managing the network slice instance.

In a possible implementation, the method further includes: sending, by the third network device to the first network device, information indicating allowed resource allocation, where the information indicating allowed resource allocation is used to indicate that the third network device is allowed to allocate a network resource corresponding to the virtualized network function to the target network slice.

In a possible implementation, the method further includes: receiving, by the third network device, resource allocation acknowledgement information sent by the first network device, where the resource allocation acknowledgement information is used to indicate that the allocation of the network resource of the virtualized network function of the target network slice instance is completed.

In a possible implementation, after the receiving, by the third network device, resource allocation acknowledgement information sent by the first network device, the method further includes: sending, by the third network device, a virtualized network function addition request to a second network device, where the virtualized network function addition request is used to request to add the virtualized network function of the target network slice instance.

According to a fourth aspect, another method for managing a network slice instance is provided. The method includes: receiving, by a fourth network device, a resource allocation request sent by a first network device, where the resource allocation request is used to request the fourth network device to allocate a network resource corresponding to a virtualized network function to the target network slice instance; and sending, by the fourth network device, resource allocation response information to the first network device, where the resource allocation response information is used to indicate that the allocation of the network resource corresponding to the virtualized network function of the target network slice instance is completed.

In this embodiment of this application, the fourth network device receives an indication of the first network device, to manage a process of creating the network slice instance, thereby automatically creating the network slice instance, and improving efficiency of managing the network slice instance.

In a possible implementation, the method further includes: receiving, by the fourth network device, a network resource extension indication sent by the first network device, where the network resource extension indication is used to instruct the fourth network device to allocate a network resource to a shared network function of the target network slice instance.

In a possible implementation, the method further includes: receiving, by the fourth network device, resource reservation indication information sent by the first network device, where the resource reservation indication information is used to instruct the fourth network device to reserve a network resource for the target network slice instance.

According to a fifth aspect, another method for managing a network slice instance is provided. The method includes: receiving, by a fifth network device, network function notification information sent by a first network device, where the network function notification information is used to indicate a network function to be configured by the first network device; and sending, by the fifth network device, network function response information to the first network device, where the network function response information is used to acknowledge that the fifth network device already determines the network function to be configured by the first network device.

In this embodiment of this application, the fifth network device receives an indication of the first network device, to manage a process of creating a network slice instance, thereby automatically creating the network slice instance, and improving efficiency of managing the network slice instance.

In a possible implementation, the method further includes: receiving, by the fifth network device, network function query information sent by the first network device, where the network function query information is used to request to query for a network function that is already generated by the fifth network device; and sending, by the fifth network device, network function feedback information to the first network device, where the network function feedback information is used to indicate the network function that is already generated by the fifth network device.

According to a sixth aspect, an apparatus for managing a network slice instance is provided. The apparatus is configured to perform the method according to any one of the first aspect or the possible implementations of the first aspect. Specifically, the apparatus includes units configured to perform the method according to any one of the first aspect or the possible implementations of the first aspect.

According to a seventh aspect, another apparatus for managing a network slice instance is provided. The apparatus is configured to perform the method according to any one of the second aspect or the possible implementations of the second aspect. Specifically, the apparatus includes units configured to perform the method according to any one of the second aspect or the possible implementations of the second aspect.

According to an eighth aspect, another apparatus for managing a network slice instance is provided. The apparatus is configured to perform the method according to any one of the third aspect or the possible implementations of the third aspect. Specifically, the apparatus includes units configured to perform the method according to any one of the third aspect or the possible implementations of the third aspect.

According to a ninth aspect, another apparatus for managing a network slice instance is provided. The apparatus is configured to perform the method according to any one of the fourth aspect or the possible implementations of the fourth aspect. Specifically, the apparatus includes units configured to perform the method according to any one of the fourth aspect or the possible implementations of the fourth aspect.

According to a tenth aspect, another apparatus for managing a network slice instance is provided. The apparatus is configured to perform the method according to any one of the fifth aspect or the possible implementations of the fifth aspect. Specifically, the apparatus includes units configured to perform the method according to any one of the fifth aspect or the possible implementations of the fifth aspect.

According to an eleventh aspect, an apparatus for managing a network slice instance is provided. The apparatus includes a communications interface, a memory, a processor, and a bus system. The communications interface, the memory, and the processor are connected to each other by using the bus system. The memory is configured to store an instruction. The processor is configured to execute the instruction stored in the memory, to control the communications interface to receive a signal and/or send a signal. Additionally, when the processor executes the instruction stored in the memory, the execution enables the processor to perform the method according to any one of the first aspect or the possible implementations of the first aspect.

According to a twelfth aspect, an apparatus for managing a network slice instance is provided. The apparatus includes a communications interface, a memory, a processor, and a bus system. The communications interface, the memory, and the processor are connected to each other by using the bus system. The memory is configured to store an instruction. The processor is configured to execute the instruction stored in the memory, to control the communications interface to receive a signal and/or send a signal. Additionally, when the processor executes the instruction stored in the memory, the execution enables the processor to perform the method according to any one of the second aspect or the possible implementations of the second aspect.

According to a thirteenth aspect, an apparatus for managing a network slice instance is provided. The apparatus includes a communications interface, a memory, a processor, and a bus system. The communications interface, the memory, and the processor are connected to each other by using the bus system. The memory is configured to store an instruction. The processor is configured to execute the instruction stored in the memory, to control the communications interface to receive a signal and/or send a signal. Additionally, when the processor executes the instruction stored in the memory, the execution enables the processor to perform the method according to any one of the third aspect or the possible implementations of the third aspect.

According to a fourteenth aspect, an apparatus for managing a network slice instance is provided. The apparatus includes a communications interface, a memory, a processor, and a bus system. The communications interface, the memory, and the processor are connected to each other by using the bus system. The memory is configured to store an instruction. The processor is configured to execute the instruction stored in the memory, to control the communications interface to receive a signal and/or send a signal. Additionally, when the processor executes the instruction stored in the memory, the execution enables the processor to perform the method according to any one of the fourth aspect or the possible implementations of the fourth aspect.

According to a fifteenth aspect, an apparatus for managing a network slice instance is provided. The apparatus includes a communications interface, a memory, a processor, and a bus system. The communications interface, the memory, and the processor are connected to each other by using the bus system. The memory is configured to store an instruction. The processor is configured to execute the instruction stored in the memory, to control the communications interface to receive a signal and/or send a signal. Additionally, when the processor executes the instruction stored in the memory, the execution enables the processor to perform the method according to any one of the fifth aspect or the possible implementations of the fifth aspect.

According to a sixteenth aspect, a system for managing a network slice instance is provided. The system includes the apparatus according to any one of the sixth aspect or the possible implementations of the sixth aspect, the apparatus according to any one of the seventh aspect or the possible implementations of the seventh aspect, the apparatus according to any one of the eighth aspect or the possible implementations of the eighth aspect, the apparatus according to any one of the ninth aspect or the possible implementations of the ninth aspect, and the apparatus according to any one of the tenth aspect or the possible implementations of the tenth aspect; or the system includes the apparatus according to any one of the eleventh aspect or the possible implementations of the eleventh aspect, the apparatus according to any one of the twelfth aspect or the possible implementations of the twelfth aspect, the apparatus according to any one of the thirteenth aspect or the possible implementations of the thirteenth aspect, the apparatus according to any one of the fourteenth aspect or the possible implementations of the fourteenth aspect, and the apparatus according to any one of the fifteenth aspect or the possible implementations of the fifteenth aspect.

According to a seventeenth aspect, a computer-readable medium is provided. The computer-readable medium is configured to store a computer program. The computer program includes an instruction for performing the method according to any one of the first aspect or the possible implementations of the first aspect.

According to an eighteenth aspect, a computer-readable medium is provided. The computer-readable medium is configured to store a computer program. The computer program includes an instruction for performing the method according to any one of the second aspect or the possible implementations of the second aspect.

According to a nineteenth aspect, a computer-readable medium is provided. The computer-readable medium is configured to store a computer program. The computer program includes an instruction for performing the method according to any one of the third aspect or the possible implementations of the third aspect.

According to a twentieth aspect, a computer-readable medium is provided. The computer-readable medium is configured to store a computer program. The computer program includes an instruction for performing the method according to any one of the fourth aspect or the possible implementations of the fourth aspect.

According to a twenty-first aspect, a computer-readable medium is provided. The computer-readable medium is configured to store a computer program. The computer program includes an instruction for performing the method according to any one of the fourth aspect or the possible implementations of the fourth aspect.

DESCRIPTION OF EMBODIMENTS

Figure 1:
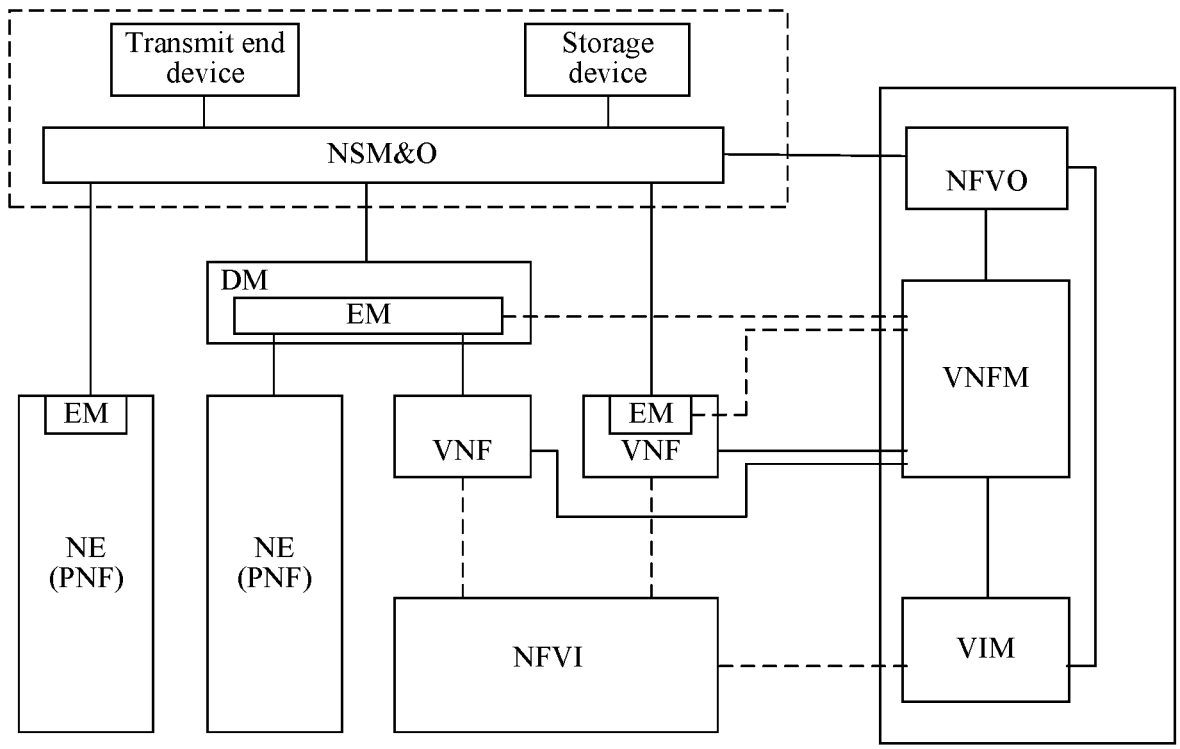
FIG. 1 is a schematic diagram of a network management architecture according to an embodiment of this application.

The following describes the technical solutions in the embodiments of this application with reference to the accompanying drawings in the embodiments of this application.

It should be understood that, the technical solutions of the embodiments of this application may be applied to various communications systems, such as a Global System for Mobile Communications (Global System of Mobile communication, GSM), a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS) system, a Long Term Evolution (Long Term Evolution, LTE) system, an LTE frequency division duplex (Frequency Division Duplex, FDD) system, an LTE time division duplex (Time Division Duplex, TDD), Universal Mobile Telecommunications System (Universal Mobile Telecommunications System, UMTS), or a Worldwide Interoperability for Microwave Access (Worldwide Interoperability for Microwave Access, WiMAX) communications system.

The embodiments of this application relate to a network slicing technology, which is used to logically abstract a network into one or more network slices. Each network slice includes a series of logical network functions, to specifically meet differentiated requirements of different service types. For example, in a 5th Generation mobile communications (The 5th Generation, 5G) network, as an on-demand networking mode, network slicing provides an operator with a new service that can be adjusted based on a changing user requirement and that can quickly meet a novel application requirement.

The network slicing technology is used to abstract a 5G network physical infrastructure resource into a plurality of network slices based on a scenario requirement. Customized tailoring of a network function as well as orchestration and management of the corresponding network function are performed on each network slice based on a requirement of a service scenario and a service model. One network slice may be considered as an instantiated 5G network. Such a network structure allows an operator to provide a network as a service to a user, and can freely combine physical networks based on indicators such as a rate, a capacity, coverage, latency, reliability, security, and availability, to meet different user requirements.

It should be noted that, the terms such as "network management architecture", "network system", and "system" in this specification may be used interchangeably. For ease of understanding, some terms in this specification are described first:

Network slicing: The concept network slicing refers to customization of different logical networks on physical or virtual network infrastructure based on different service requirements.

A network slice instance is a real running logical network.

A network slice template is a manner of generating a network slice instance, and is used to provide a reference for generating a network slice instance. The network slice template specifies how the network slice instance should be generated. For example, the network slicing module may indicate network functions included in a network slice and a key performance indicator (Key Performance Indicators, KPI) indicator that should be reached.

A network function is a processing function in a network, and defines a functional behavior and an interface. The network function may be used as dedicated hardware, may be implemented by running software on dedicated hardware, or may be implemented in a form of a virtual function on a universal hardware platform. Therefore, from a perspective of implementation, network functions may be classified into a physical network function and a virtualized network function. From a perspective of use, network functions may be classified into a dedicated network function and a shared network function. Specifically, for a plurality of network slice instances, different network functions can be used independently, and such a network function is referred to as a dedicated network function; or a same network function may be shared, and such a network function is referred to as a shared network function.

For ease of understanding the embodiments of this application, a network management architecture in FIG. 1 is described first. FIG. 1 shows a network management architecture 100. In an example, the network management architecture 100 in FIG. 1 may be a 3GPP public land mobile network (Public Land Mobile Network, PLMN) network management architecture integrated with a network functions virtualization (Network function virtualized, NFV) management and orchestration (Management and orchestration, MANO) module. Specifically, the network management architecture 100 includes both a module for managing a physical network function and a module for managing a virtualized network function. The modules in the network management architecture 100 are described one by one below.

A physical network function (Physical network function, PNF) module is a physical device providing a fixed network function. For example, the physical network function module may be a network element (Network element, NE), namely, a physical network element in a conventional 3GPP network management architecture. For example, the NE may be a base station, a mobility management entity (Mobility management entity, MME), or a serving gateway (Serving Gateway, "SGW" for short).

A virtualized network function (Virtualized network function, VNF) module may be a smallest virtual unit that can be monitored and managed in the network management architecture. There is a communications interface between the VFN and an NFVI module described below. The VNF module may create a virtualized network function and perform some parameter configuration based on the NFVI, to implement a network function.

An element manager (Element manager, EM) is a network module configured to manage a network element. The EM may be configured to manage a physical network function (namely, the PNF module), and may also be configured to manage a virtualized network function (namely, the VNF module). The network management architecture may include one EM module, or may include a plurality of EM modules. When there are a plurality of EM modules, each of the plurality of EM modules is configured to manage a corresponding virtualized network function or physical network function, or a single EM module may manage both a corresponding virtualized network function and physical network function.

A domain manager (Domain manager, DM) is a management system module that is one level larger than a management scope of the EM. The DM may manage one or more EMs. For example, the DM may be a management system of a vendor.

It should be noted that, the EM and the DM have different definitions. The EM directly manages a same type of network devices, for example, a series of base stations. The DM manages a network device belonging to an operator (vendor), and provides a domain management function. The DM manages a larger scope than the EM. Usually, an EM device is configured to configure a network function. However, a possibility that the DM performs a procedure performed by the EM is not excluded in the embodiments of this application.

A network manager (Network manager, NM) is a management module at a network level, and mainly provides a network management function, a function related to exchange between management devices, and the like. For example, the NM may be responsible for distribution, configuration, control, and monitoring of network resources. The NM is supported by the EM or the DM.

A network function virtualized infrastructure (Network function virtualized infrastructure, NFVI) module is configured to deploy a virtualized network function (namely, a VNF) and may be a set of running environment including software and hardware, including a virtual layer, an abstract hardware resource, and the like.

An interface exists between an NFV-MANO system module and the NFVI module, the VNF module, the EM module, and the NM module, to manage a virtualized network function at the network level. The NFV-MANO system module includes the following three modules:

a network function virtualization orchestrator (Network function virtualization orchestrator, NFVO) module, configured to manage a network service and a lifecycle of a VNF, and optimize a network resource from a global perspective of the NFVI;

a virtualized network function management module (Virtualized network function manager, VNFM) module, configured to manage the VNF module at the network level; and a virtualized infrastructure manager (Virtualized infrastructure manager, VIM), having an interface with the NFVI and the VNF, and configured to manage allocation of computing, storage, and network resources of the NFVI.

It can be learned from the foregoing descriptions of the network management architecture 100 that, although a physical network function and a virtualized network function can be managed in the network management architecture 100, a network slice cannot be managed or orchestrated in the network management architecture 100. Therefore, the network management architecture 100 cannot meet an application requirement of the network slicing technology in a future communications system, that is, a network slice cannot be flexibly managed or orchestrated.

To reduce deployment costs and the like, the physical network element and the virtualized network element may coexist for a long time and flexibly form a network slice. Therefore, a network management system is required, to orchestrate and manage physical and virtual network functions or network resources, to apply a network slice.

The embodiments of this application provide a method, an apparatus, and a system for managing a network slice instance. The core idea of the embodiments of this application is to introduce a network slice manager and orchestrator (Network slice manager and orchestrator, NSM&O) module to a network management architecture, and manage a process of creating a network slice instance by using the NSM&O module, thereby automatically creating the network slice instance and improving efficiency of managing the network slice instance.

Figure 2:
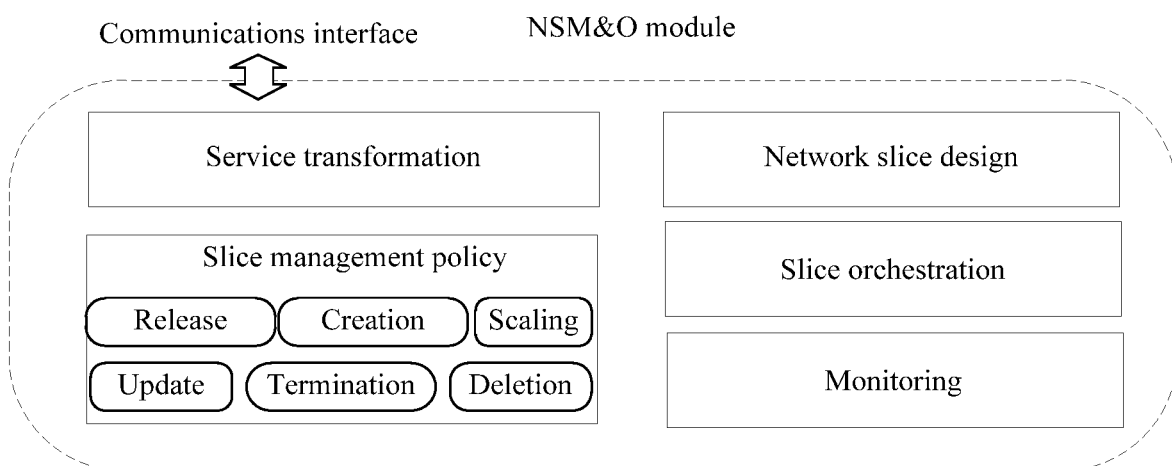
FIG. 2 is an architectural diagram of an NSM&O according to an embodiment of this application.

The network management architecture in the embodiments of this application is described below. In the embodiments of this application, based on an existing network management architecture, an NSM&O module is introduced. A schematic structural diagram of the NSM&O module is shown in FIG. 2, and main functions of the NSM&O module include:

service transformation: receiving, through an interface (which, for example, may be an application programming interface (Application Programming Interface, API)), service description information sent by a transmit end device, and transforming the service description information into a requirement for a network;

network slice design: describing the composition of a network slice based on a result of the service transformation, which, for example, may be design of a network slice template (Network Slice Descriptor, NSLD);

a network slice management policy: designing a management policy for a network slice, which, for example, may be a policy such as network slice instantiation, network slice scaling, network slice update, network slice termination, and network slice deletion;

network slice orchestration: used to specifically determine a network function included in a network slice instance and a used network resource; and monitoring: used to monitor and report a status parameter of a network slice instance, where, for example, a key performance indicator (Key Performance Indicators, KPI) parameter of the network slice instance may be monitored.

The transmit end device may also be referred to as a sender (English). The transmit end device is a device that sends a request to the NSM&O module. For example, the transmit end device may be an operator, a third-party client, an application related to a communications service, or any physical device that may send a request to the NSM&O module.

Optionally, the network management architecture in the embodiments of this application may further include a storage device. The storage device may be configured to record information about a network slice instance that is already generated.

To better understand the network management architecture in the embodiments of this application, specific examples of the network management architecture in the embodiments of this application are described below with reference to FIG. 3 to FIG. 6. A person skilled in the art can understand that the examples in FIG. 3 to FIG. 6 are merely intended to help a person skilled in the art understand the embodiments of this application, rather than limit the embodiments of this application to illustrated specific values or specific scenarios. A person skilled in the art apparently can make various equivalent modifications or changes based on the examples provided in FIG. 3 to FIG. 6, and such modifications or changes also fall within the scope of the embodiments of this application.

Four network management architectures in the embodiments of this application are respectively described in FIG. 3 to FIG. 6. The four network management architectures each include an NSM&O module. For ease of distinguishing, the network management architectures in FIG. 3 to FIG. 6 are referred to as a first network management architecture, a second network management architecture, a third network management architecture, and a fourth network management architecture below.

Figure 3:
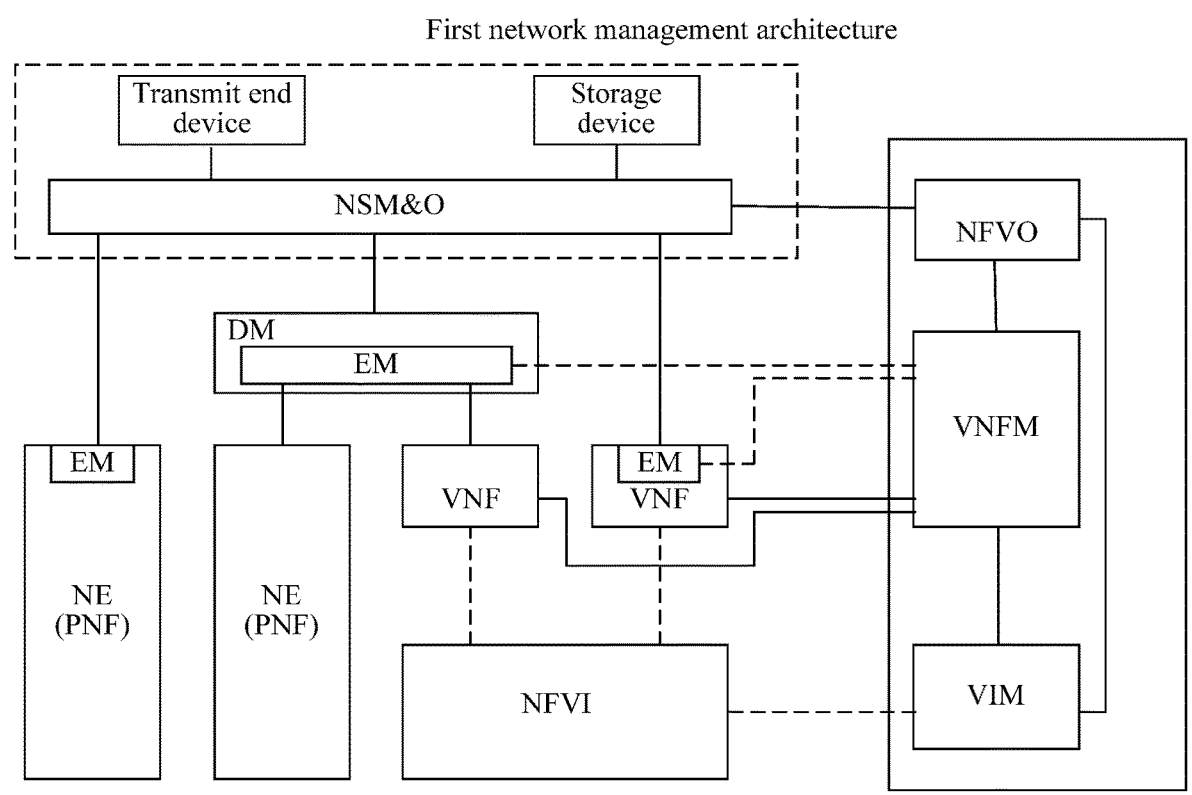
FIG. 3 is a schematic diagram of a network management architecture to which an embodiment of this application is applied.

FIG. 3 is a schematic structural diagram of the first network management architecture. As shown in FIG. 3, the first network management architecture is a network management architecture enhanced and modified based on the network management architecture 100. The first network management architecture does not include an NM module, but instead, the NSM&O module performs a function performed by the NM module in the network management architecture 100. In other words, in addition to the function shown in FIG. 2, the NSM&O module may further include all functions of the NM module. The NSM&O module may interact with an EM through a communications interface, to manage a network function corresponding to a network slice instance. Management of the network function includes management of a PNF module and a VNF module. The NSM&O module may further receive status information of the VNF module from an NFVO module through the communications interface, and send an instruction to the NFVO through the communications interface.

For the first network management architecture, the NSM&O module can directly manage a physical network function, and can orchestrate and manage a resource of an NFVI module and generate a VNF by using the NFVO module.

Figure 4:
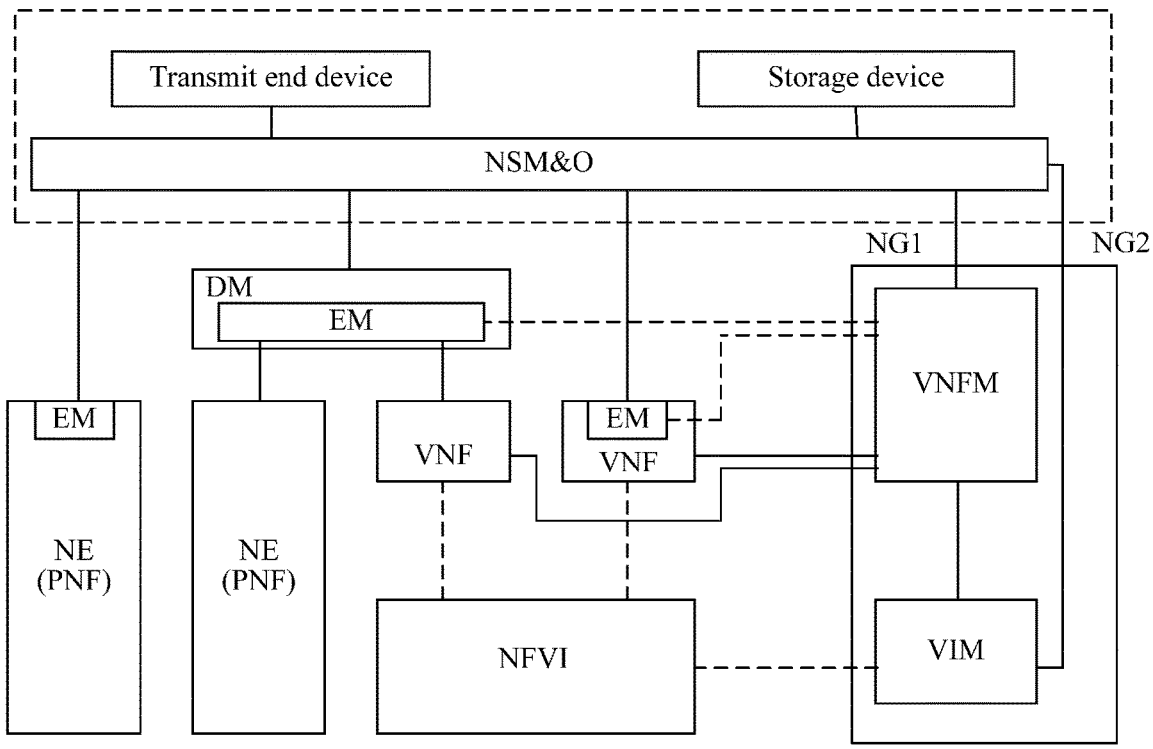
FIG. 4 is a schematic diagram of another network management architecture to which an embodiment of this application is applied.

FIG. 4 is a schematic structural diagram of the second network management architecture according to an embodiment of this application. As shown in FIG. 4, the second network management architecture is also a network management architecture enhanced and modified based on the network management architecture 100. A difference between the second network management architecture and the first network management architecture lies in that: the second network management architecture does not include an entity of an NFVO module. A function of the NFVO module is implemented by an NSM&O module. In other words, a function of the NSM&O module further includes orchestration and management of a virtual network resource and management of a lifecycle of a VNF. There is a communications interface between the NSM&O module and a VNFM module, and in FIG. 4, the interface may be referred to as an NG1 interface. There is a communications interface between the NSM&O module and a VIM module, and in FIG. 4, the interface may be referred to as an NG2 interface.

The NSM&O module and the VNFM module may perform the following interaction through the NG1 interface: NFVI resource authorization, reservation, allocation, release, and the like for supporting a VNF; querying for information about a running status, for example, querying for a VNF instance; VNF initialization, update, scaling, termination, and the like; and transmitting an event, status information, and the like related to the VNF.

The NSM&O module and the VIM module may perform the following interaction through the NG2 interface: NFVI resource reservation, allocation, release, and the like; VNF software image (image) addition, deletion, update, and the like; and transmitting configuration information, an event, a measurement result, an upgrade record, and the like related to NFVI.

For the second network management architecture, in addition to directly managing a physical network function, the NSM&O module can further manage a virtualized network function and a lifecycle of a VNF, to uniformly manage and orchestrate physical and virtual network resources and functions. This is advantageous to optimize resources from a global perspective.

Figure 5:
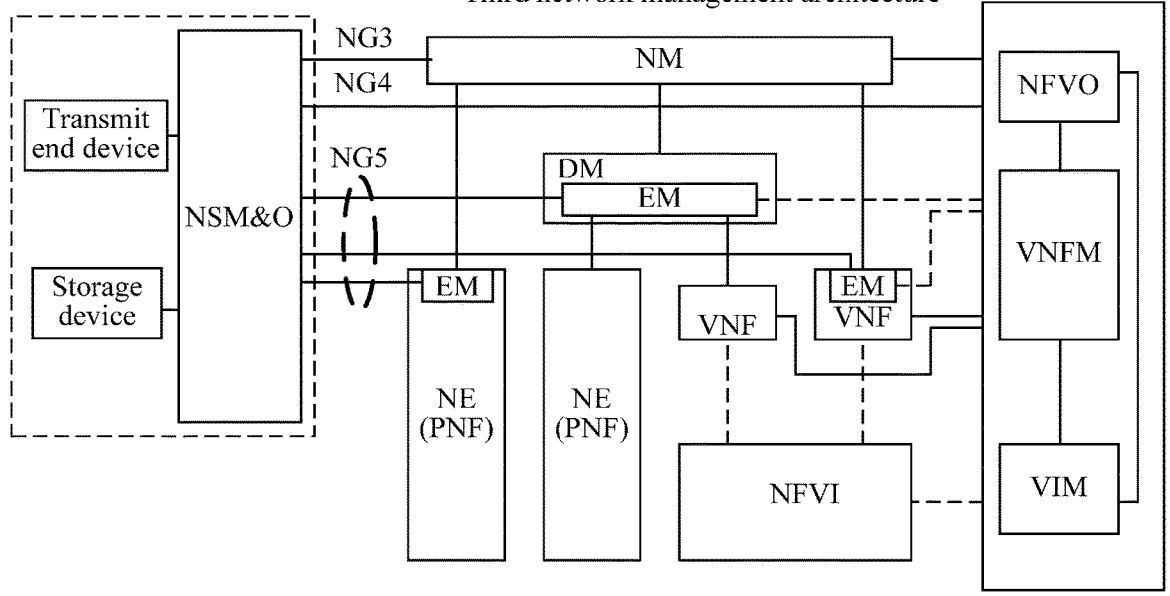
FIG. 5 is a schematic diagram of another network management architecture to which an embodiment of this application is applied.

FIG. 5 is a schematic structural diagram of the third network management architecture according to an embodiment of this application. As shown in FIG. 5, an NM module is maintained in the third network management architecture, and an NSM&O module and the NM module are independent of each other. Additionally, there is a communications interface between the NSM&O module and the NM module, and in FIG. 5, the communications interface may be referred to as an NG3 interface. There is also a communications interface between the NSM&O module and an NFVO module, and in FIG. 5, the communications interface may be referred to as an NG4 interface. There is also a communications interface between the NSM&O module and an EM module, and in FIG. 5, the communications interface may be referred to as an NG5 interface.

The NSM&O module and the NM module may perform the following interaction through the NG3 interface: transmitting negotiation information between the NSM&O module and the NM module, for example, querying, by the NSM&O module, for a VNF that is already generated by the NM module; feeding back, by the NM module, information about the VNF that is already generated to the NSM&O module, and determining that the NSM&O module is allowed to modify the information about the VNF; notifying, by the NSM&O module, the NM module of PNFs/VNFs to be modified; and notifying, by the NSM&O module, the NM module of specific modification content for the PNF/the VNF.

The NSM&O module and the NFVO module may perform the following interaction through the NG4 interface: participating, by the NSM&O module through the NG4 interface, in management of a lifecycle of a VNF, for example, instructing the NFVO module to generate, update, or delete a VNF; querying, by the NSM&O module, the NFVO module for VNF and NFVI running information; feeding back, by the NFVO module, the VNF and NFVI running information to the NSM&O module; performing policy management, where the NSM&O module may send a policy to the NFVO module, to specify a requirement for VNF deployment; and managing, by the NSM&O module, a VNF package (package) through the NG4 interface.

The NSM&O module and the EM module may perform the following interaction through the NG5 interface: communicating, by the NSM&O module, with the EM module through the NG5 interface, to manage a PNF and a VNF (if the EM supports management of a VNF).

For the third network management architecture, the NSM&O module uses a new communications interface to interact with each physical module in the third network management architecture. The NSM&O module may orchestrate and manage a virtual resource by using the NFVO module and participate in management of a lifecycle of a VNF. The NSM&O module and the NM module both can directly manage a PNF. Additionally, the NSM&O module and the NM module both can manage a VNF by using the NFVO module or the EM module. Therefore, for management of a PNF and a VNF, the NSM&O module and the NM module may perform coordination through communication.

Figure 6:
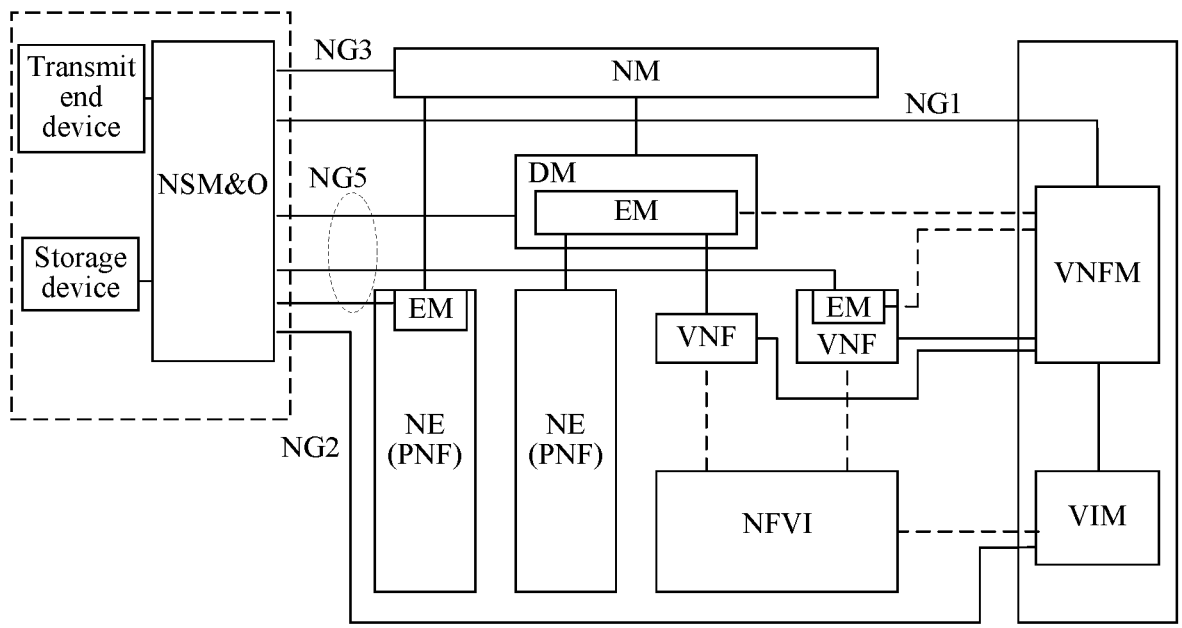
FIG. 6 is a schematic diagram of another network management architecture to which an embodiment of this application is applied.

FIG. 6 is a schematic structural diagram of the fourth network management architecture according to an embodiment of this application. As shown in FIG. 6, an NM module is also maintained in the fourth network management architecture. An NSM&O module and the NM module are also independent of each other. A difference between the fourth network management architecture and the third network management architecture lies in that: the fourth network management architecture does not include an entity of an NFVO module. A function of the NFVO module is implemented by the NSM&O module. In other words, a function of the NSM&O module further includes orchestration and management of a virtual network resource and management of a lifecycle of a VNF. There is a communications interface between the NSM&O module and a VNFM module, and in FIG. 6, the communications interface may be referred to as an NG1 interface. There is a communications interface between the NSM&O module and a VIM module, and in FIG. 6, the communications interface may be referred to as an NG2 interface. There is a communications interface between the NSM&O module and an EM module, and in FIG. 6, the communications interface may be referred to as an NG5 interface. For specific functions of the NG1 interface, the NG2 interface, and the NG5 interface, refer to same or similar content in FIG. 4 and FIG. 5. For brevity, details are not described herein again.

For the fourth network management architecture, the NSM&O module uses a new communications interface to interact with each physical module in the fourth network management architecture. The NSM&O module may orchestrate and manage a virtual resource by using the NFVO module and participate in management of a lifecycle of a VNF. The NSM&O module and the NM module both can directly manage a PNF. Therefore, for management of a PNF, the NSM&O module and the NM module may perform coordination through communication. Additionally, because the NSM&O module is integrated with a function of an NSFO module, the NSM&O module can further directly orchestrate and manage a network resource and participate in management of a lifecycle of a VNF. The NM module does not manage a virtual network resource and a VNF.

The network management architectures in the embodiments of the present invention are described above with reference to FIG. 1 to FIG. 6. A method for managing a network slice instance in an embodiment of this application is described below with reference to the drawings. The method for managing a network slice instance is applicable to the first network management architecture to the fourth network management architecture in the embodiments of this application. Alternatively, the method for managing a network slice instance is applicable to another similar network management architecture. This is not limited in the embodiments of this application. In the following method for managing a network slice instance, a first network device may be the NSM&O module in the network management architectures in the embodiments of this application, a second network device may be the EM module in the network management architectures, a third network device may be the VNFM module or the NFVO module in the network management architectures, a fourth network device may be the VIM module in the network management architectures, and a fifth network device may be the NM module in the network management architectures. Alternatively, the first network device to the fifth network device may be other physical apparatuses having corresponding functions in the network management architectures. This is not limited in the embodiments of this application.

Figure 7:
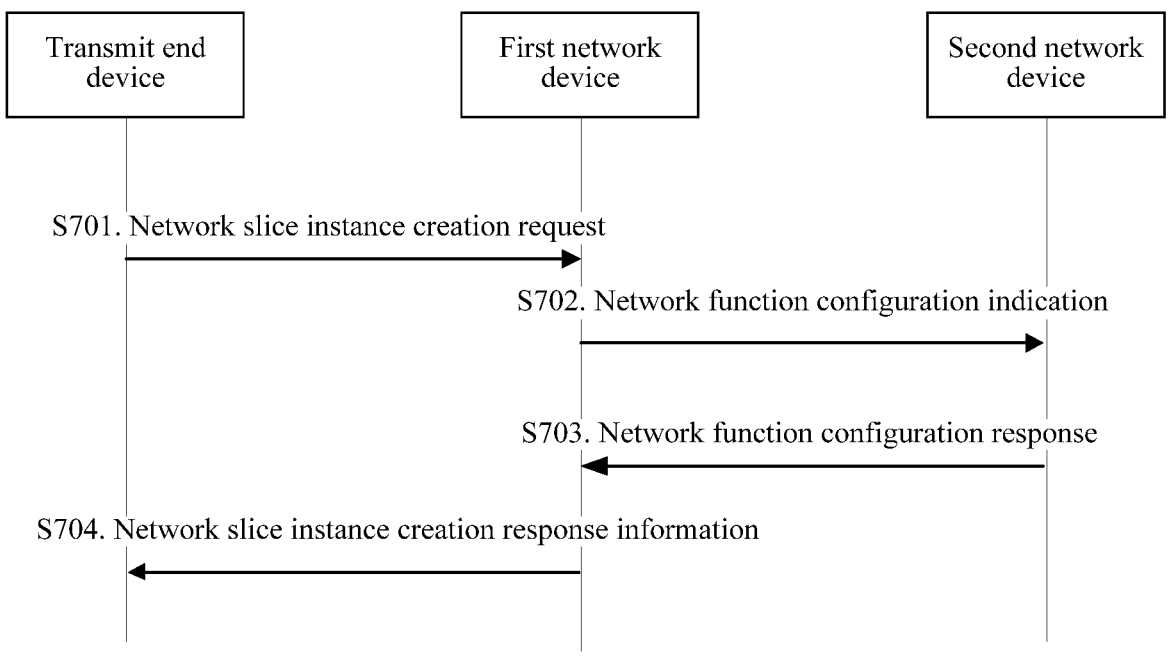
FIG. 7 is a schematic flowchart of a method for managing a network slice instance according to an embodiment of this application.

FIG. 7 shows a method 700 for managing a network slice instance according to an embodiment of this application. The method 700 includes the following steps.

S701. A first network device receives a network slice instance creation request from a transmit end device, where the network slice instance creation request is used to request to create a target network slice instance, and the network slice instance creation request includes description information of the target network slice instance.

Optionally, after receiving the network slice instance creation request, a network slice corresponding to the target network slice instance needs to be designed based on the description information of the target network slice instance. The network slice may be designed in at least two manners. In one manner, a network slice template may be preset, and the network slice template may be designed based on different service types. In other words, there may be a plurality of network slice templates for a plurality of service types. The first network device may determine a corresponding network slice template and a configuration parameter of the network slice template based on the description information of the network slice instance. Alternatively, the first network device may make a modification based on the network slice template based on the description information of the network slice instance, to design a network function of the network slice corresponding to the network slice instance. In another manner of designing the network slice, a network slice template may not be preset, and the first network device directly designs a network function of the network slice based on the description information of the network slice instance.

Optionally, the description information may include at least one of the following information: description information of a service requirement of the target network slice instance and configuration parameter information of a network slice template of the target network slice instance.

When the description information of the target network slice instance is the description information of the service requirement, the first network device may transform the description information of the target network slice instance into a requirement of the target network slice instance for a network based on the description information of the service requirement, and design the network slice based on the requirement for the network, for example, directly describe the composition of the target network slice instance, or determine, based on the requirement for the network, the configuration parameter information of the network slice template corresponding to the target network slice instance. For example, the description information of the service requirement may be a mobile broadband (Mobile Broadband, MBB)/ultra-reliable and low latency communications (Ultra-reliable low-latency communication, URLLC)/machine type communications (Machine Type communication, MTC) service that meet a particular KPI requirement.

When the description information of the target network slice instance is the configuration parameter information of the network slice template, the configuration parameter information of the network slice template may be determined based on the description information of the target network slice instance, to complete design of the target network slice instance. The configuration parameter information of the network slice template may be an input parameter of the network slice template. In a specific example, for example, there is already a network slice template of an MTC service in an NSM&O module, and the transmit end device may describe required configuration parameter information of a network slice instance of the MTC service in the description information in the network slice instance creation request based on a target configurable parameter opened for a network slice. For example, the configuration parameter information may include information such as a quantity of connections.

S702. The first network device sends network function configuration indication information to a second network device based on the description information, where the network function configuration indication information is used to instruct the second network device to configure a network function of the target network slice instance.

Optionally, the network function may include at least one of a physical network function and a virtualized network function.

In this embodiment of this application, the network function included in the network slice instance may be a physical network function, may be a virtualized network function, or includes both a physical network function and a virtualized network function, so that the network function of the network slice instance can be flexibly orchestrated and managed as required. For example, when the virtualized network function cannot support a particular network function, a physical network element may be selected to implement the network function.

Optionally, in this embodiment of this application, the network function included in the network slice instance may be a shared network function, or may be a dedicated network function. The shared network function is a network function that can be shared by a plurality of network slice instances. The dedicated network function may be a network function used by a separate network slice instance. For example, a plurality of network slice instances may be created, the plurality of network slice instances may all use several shared network functions, and each network slice instance may also include a dedicated network function that is used only by the network slice instance.

Optionally, in this embodiment of this application, there are a plurality of cases of configuring the network slice instance. In the first case, the network function of the network slice instance is a dedicated network function, and the network function is a physical network function. In the second case, the network function of the network slice instance is a dedicated network function, and the network function is a virtualized network function. In the third case, the network function of the network slice instance may be a sharable network function. The sharable network function means that the network function can be shared by a plurality of network slice instances. There are two cases for the sharable network function: In one case, the network function is currently shared by the plurality of network slice instances, and in the other case, only one network slice instance is currently used, that is, the network function currently is still a dedicated network function, but may be shared by another network slice instance in the future. The sharable network function may be a physical network function or may be a virtualized network function.

In the third case, there are further two branches. In the first branch, the sharable network function does not start to be run. In the second branch, the sharable network function already starts to be run. In other words, the sharable network function is already used by another network slice instance. Processes of configuring the network slice instance for the three cases are described below.

In the first case, that is, the network function includes a dedicated physical network function, because a PNF module is a physical network element, the PNF module is a module that actually exists, and there is no concept of generating a PNF module, the second network device only needs to configure the physical network function of the target network slice instance, to enable the configured physical network function to serve the target network slice instance.

In the second case, that is, the network function includes a dedicated virtualized network function, because a VNF module is a module for performing the virtualized network function, the first network device needs to determine whether a VNF module corresponding to the target network slice instance is already created or generated. In this embodiment of this application, a third network device module is responsible for creating or generating the VNF module. When the VNF module is already generated, the first network device may directly instruct the second network device to configure a corresponding virtualized network function for the VNF module. When the VNF module is not generated, the first network device may instruct the third network device to generate the VNF module, and then instruct the second network device to configure a corresponding virtualized network function for the generated VNF module.

In the first branch in the third case, that is, the sharable network function does not start to be run, or the shared network function is not configured, the first network device may instruct the second network device to configure the shared network function. The shared network function may be a physical network function or a virtualized network function. A manner of configuring the shared network function is the same as or similar to the foregoing manner of configuring the dedicated network function. For example, for a shared virtualized network function that is not generated, a new virtualized network function may be created, to support a new network slice instance.

It should be understood that, because the shared network function currently serves only the newly created network slice instance, and is not shared by another network slice instance, the current shared network function is similar to a dedicated network function, and serves only a single network slice instance. However, the shared network function may be shared by the another network slice instance in the future. That is, the shared network function may be configured in the future, to enable the shared network function to also serve the another network slice instance. For example, the configured shared network function may be identified, and the identification is used to indicate that the shared network function currently serves the target network slice instance, but the network function may be shared with the another network slice instance in the future.

In the second branch in the third case, that is, the sharable network function already starts to be run, or the sharable network function is already used by another network slice instance, the first network device needs to instruct the second network device to configure the shared network function, so that the target network slice instance can share the network function with the another network slice instance. Optionally, the sharable network function that is currently run is a network function that is already used by one network slice instance, or may be a function that is already used by a plurality of network slice instances. When the sharable network function is a network function that is already used by one network slice instance, the sharable network function may be a dedicated network function in an initial state, and the dedicated network function may be reconfigured as a shared network function. Optionally, the first network device may interact with the third network device and a fourth network device, to configure the shared network function in a coordinated manner.

For example, when a plurality of network slice instances share a network resource, a network resource corresponding to the shared network function may need to be extended, to support a newly generated network slice instance. Therefore, the first network device may send a network resource extension indication to the fourth network device. The network resource extension indication is used to instruct the fourth network device to allocate a network resource to the shared network function of the target network slice instance.

Optionally, the network function configuration indication information includes configuration information required for configuring the network function of the target network slice instance. For example, the configuration information may include, but is not limited to: a related parameter of the network slice instance, an identifier of the network slice instance, a type of the network slice instance, and another parameter needing to be monitored and reported. Additionally, in addition to the related parameter of the network slice instance, the configuration information further includes a conventional running parameter, for example, a mobility management entity code (Mobility Management Entity Code, MMEC) and an MME pool (Pool).

It should be noted that, when the network function of the network slice instance includes a shared network function, optionally, the network function configuration indication information may further include information about the shared network function included in the network slice instance or configuration information of another network slice instance sharing the network function. For example, when the shared network function is a non-access stratum (Non-access Stratum, NAS) message routing (routing) network function, configuration information of the network slice instance of the shared network function needs to be obtained, to determine how to route NAS information to a corresponding network slice instance.

Optionally, when the network function of the target network slice instance includes a sharable network function, the network function configuration indication information may include an identifier of the target network slice instance.

Optionally, compared with the dedicated network function, there are many cases for configuring the shared network function in the network function configuration indication information. For example, if a newly created network slice instance is to use a shared network function that already exists and is currently used by another network slice instance, content needing to be configured includes: (a). providing information, so that the shared network function can serve the newly generated network slice instance. Using a "network slice selection function" as an example, if the function is a shared network function, the newly generated network slice instance needs to perceive existence of a network slice instance of another shared network function, to select a proper network slice instance. Therefore, for the "network slice selection function" or another network function, an identifier of a newly generated target network slice instance needs to be configured.

Optionally, when the network function of the target network slice instance includes a sharable network function, the network function configuration indication information may include a mapping relationship between the shared network function and a plurality of network slice instances sharing the network function.

In a specific example, using the NAS message routing function as an example, usually, the function may be a shared network function. The function is mainly used to forward a NAS message received by a mobility management (Mobility Management, MM) function to a session management (Session Management) function corresponding to a correct network slice instance. A path of the foregoing function is: MM function (shared)->NAS routing function (shared)->SM function (dedicated). Therefore, for the NAS routing function, a mapping relationship between the identifier of the newly generated network slice instance and an identifier of the SM function needs to be learned of. In other words, a mapping relationship between the NAS routing function and SM functions of a plurality of network slice instances needs to be configured in the network slice instance. The configuration is usually performed in the shared network function neighboring to the dedicated network function, so that the shared network function can transmit a message to a correct network slice instance in the plurality of network slice instances.

Optionally, in a specific example, because the shared network function is to serve the newly generated network slice instance, a more powerful processing capability is required. Therefore, more computing resources, storage resources, or network resources need to be added to the shared network function. For example, for a sharable network function, namely, an MM function, a main function of the MM function is to track a user position in the slice. Therefore, when the MM supports more network slice instances, more computing and storage resources may be required.

S703. The first network device receives network function configuration response information sent by the second network device, where the network function configuration response information indicates that the configuration of the network function of the target network slice instance is completed.

After the second network device completes the configuration of the network function of the target network slice instance, the first network device receives the network function configuration response information sent by the second network device, to indicate, to the second network device, a result of configuring the network function of the target network slice instance.

Optionally, if the second network device fails to configure the network function of the target network slice instance, the network function configuration response information may also indicate that the network function of the target network slice instance fails to be configured, so that the first network device re-stipulates a management and orchestration policy of the target network slice instance.

S704. The first network device sends network slice instance creation response information to the transmit end device, where the network slice instance creation response information indicates that the creation of the target network slice instance is completed.

Optionally, in this embodiment of this application, after receiving the network function configuration response information sent by the second network device, the first network device may send the network slice instance creation response information to the transmit end device, to indicate a result of creating the network slice instance. Optionally, when the configuration of the network function of the target network slice instance is completed, the network slice instance creation response information indicates, to the transmit end device, successful creation of the network slice instance; or when the network function of the target network slice instance fails to be configured, the network slice instance creation response information may indicate, to the transmit end device, a failure of the creation of the network slice instance.

In this embodiment of this application, the first network device instructs the second network device to configure the network function of the network slice instance, to manage a creation process of the network slice instance, thereby automatically creating the network slice instance, and improving efficiency of managing the network slice instance.

Optionally, when the network function of the target network slice instance includes a virtualized network function, and the virtualized network function of the target network slice instance is not created, the method 700 further includes: sending, by the first network device, a virtualized network function creation request to the third network device, where the virtualized network function creation request is used to instruct the third network device to create the virtualized network function of the target network slice instance.

The third network device may be the VNFM module in the second network management architecture or the fourth network management architecture, or may be the NVFO module in the first network management architecture or the third network management architecture.

Optionally, when the virtualized network function is created, the fourth network device needs to allocate a corresponding network resource to the virtualized network function. The fourth network device may receive a resource allocation request from the NVFO module, and allocates the corresponding network resource. In an example, when the third network device is the NVFO module, the third network device may send the resource allocation request to the fourth network device, to request the fourth network device to allocate the network resource corresponding to the virtualized network function to the target network slice instance.

Optionally, when the third network device is the VNFM module, the first network device further includes a function of the NVFO module. Therefore, the first network device sends a resource allocation request to the fourth network device. Therefore, the method 700 further includes: sending, by the first network device, a resource allocation request to the fourth network device, where the resource allocation request is used to request the fourth network device to allocate a network resource corresponding to the virtualized network function to the target network slice instance.

Optionally, after the sending, by the first network device, a resource allocation request to the fourth network device, the method 700 further includes: receiving, by the first network device, resource allocation response information sent by the fourth network device, where the resource allocation response information is used to indicate that the allocation of the network resource corresponding to the virtualized network function of the target network slice instance is completed. The resource allocation response information may be used to indicate a result of allocating the network resource corresponding to the virtualized network function of the target network slice instance. Optionally, if the fourth network device does not complete the allocation of the network resource, the resource allocation response information may indicate a failure of the allocation of the network resource corresponding to the virtualized network function of the target network slice instance.

Optionally, after the configuring, by the third network device, the virtualized network function of the target network slice, the method 700 further includes: receiving, by the first network device, virtualized network function creation response information sent by the third network device, where the virtualized network function creation response information indicates that the creation of the virtualized network function of the target network slice instance is completed. Optionally, the virtualized network function creation response information may be used to indicate a result of creating the virtualized network function of the target network slice. Optionally, when the third network device fails to create the virtualized network function, the virtualized network function creation response information may indicate a failure of the creation of the virtualized network function of the target network slice instance.

Optionally, after the receiving, by the first network device, resource allocation response information sent by the fourth network device, the method 700 further includes: sending, by the first network device, resource allocation acknowledgement information to the third network device, where the resource allocation acknowledgement information is used to indicate that the allocation of the network resource corresponding to the virtualized network function of the target network slice instance is completed. The first network device sends the resource allocation acknowledgement information to the fourth network device, so that after determining that the allocation of the network resource is completed, the third network device configures the virtualized network function of the target network slice instance.

Optionally, after completing the configuration of the virtualized network function and before sending the virtualized network function configuration response information to the first network device, the third network device may send a virtualized network function module addition request to the second network device, to add a generated virtualized network function module as a management device of the second network device.

Optionally, in the third network management architecture or the fourth network management architecture, the NSM&O module and the NM module both can configure a network function. Therefore, the NSM&O module and the NM module may exchange a status of configuring the network function, to coordinate the configuration of the network function. Therefore, the method 700 further includes: sending, by the first network device, network function notification information to a fifth network device, where the network function notification information is used to indicate a network function to be configured by the first network device. Therefore, the first network device and the fifth network device can coordinate the configuration of the network function, thereby improving efficiency of managing the network slice. The network function to be configured may include a physical network function, or may include a virtualized network function.

Optionally, the method 700 further includes: receiving, by the first network device, network function response information sent by the fifth network device, where the network function response information is used to acknowledge that the fifth network device already determines the network function to be configured by the first network device.

Optionally, the method 700 further includes: sending, by the first network device, network function query information to the fifth network device, where the network function query information is used to request to query for a network function that is already generated by the fifth network device. Optionally, the first network device receives network function feedback information sent by the fifth network device, where the network function feedback information is used to indicate the network function that is already generated by the fifth network device, so that the first network device coordinates the configuration of the network function. The network function that needs to be queried for may be a virtualized network function. For example, for the third network management architecture, the NSM&O module may directly manage a physical network function module, but a configuration parameter of the NM module for a virtual network module may be stored only in the NM module. Therefore, the NSM&O module needs to query the NM module for a virtualized network function generated by the NM module, so that the NSM&O module manages and orchestrate the network function. The network that is already generated includes two types: a first type is a network function that is currently run; and a second type is a network function that is already generated but is not run. Optionally, the NSM&O module may configure the network function that is already generated by the NM module, thereby improving resource utilization efficiency.

Optionally, after receiving the network slice instance creation request, the first network device may check whether the network slice instance creation request is valid. Therefore, the method 700 further includes: sending, by the first network device, validity check information to a storage device, where the validity check information is used to request to query whether the network slice instance creation request is valid; and receiving, by the first network device, validity check response information sent by the storage device, where the validity check response information is used to indicate whether the network slice instance creation request is valid.

If the validity check response information indicates that the network slice instance creation request is invalid, the first network device may not perform an operation of configuring the network function of the target network slice instance. If the validity check response information indicates that the network slice instance creation request is valid, the first network device may perform a corresponding operation of configuring the network function.

In an example, the sending, by the first network device, network function configuration indication information to a second network device based on the description information includes: when the validity check response information indicates that the network slice instance creation request is valid, sending, by the first network device, the network function configuration indication information to the second network device based on the description information.

Optionally, the storage device may be a distributed memory, or may be another type of memory. The storage device may be configured to store user subscription information, to check validity of the network slice instance creation request.

Optionally, after receiving the network slice instance creation request, the first network device may interact with the second network device, the third network device, and the fourth network device through a communications interface, to query for a running status of a current network function and an occupation status of a network resource, or may reserve a network resource for the target network slice instance. For example, the first network device may send resource reservation indication information to the fourth network device. The resource reservation indication information is used to instruct the fourth network device to reserve a network resource for the target network slice instance.

Optionally, if the first network device finds that current network resources are insufficient for running the target network slice instance, the first network device may send, to the transmit end device, failure feedback information indicating insufficient network resources.

Optionally, after the first network device receives the network function configuration response information sent by the second network device, the first network device may set a state of the network slice instance to an active state. In an example, the method 700 further includes: sending, by the first network device, a network slice instance activation indication to the storage device, where the target network slice instance is set to an active state based on the network slice instance activation indication.

Optionally, after determining to activate the target network slice instance, the method 700 further includes: sending, by the first network device, a network function port activation indication to the second network device, where the network function port activation indication is used to activate a port for the network function of the target network slice instance.

Optionally, after activating the target network slice instance, the first network device may instruct the storage device to store a configuration parameter of the newly generated network slice instance into the storage device. The method 700 further includes: sending, by the first network device, a network slice instance update indication to the storage device, where the network slice instance update indication is used to instruct to store the parameter information of the target network slice instance into the storage device. In an example, the parameter information of the target network slice instance that is stored into the storage device may include a shared network function or a type of a sharable network slice instance.

The method for managing a network slice instance in this embodiment of this application is described above with reference to FIG. 7. Specific procedures of managing a network slice instance in the foregoing four network management architectures are respectively described below with reference to specific examples in FIG. 8 to FIG. 11B. It should be noted that, the examples in FIG. 8 to FIG. 11B are merely intended to help a person skilled in the art understand the embodiments of this application, rather than limit the embodiments of this application to illustrated specific values or specific scenarios. A person skilled in the art apparently can make various equivalent modifications or changes based on the examples provided in FIG. 8 to FIG. 11B, and such modifications or changes also fall within the scope of the embodiments of this application.

Figure 8:
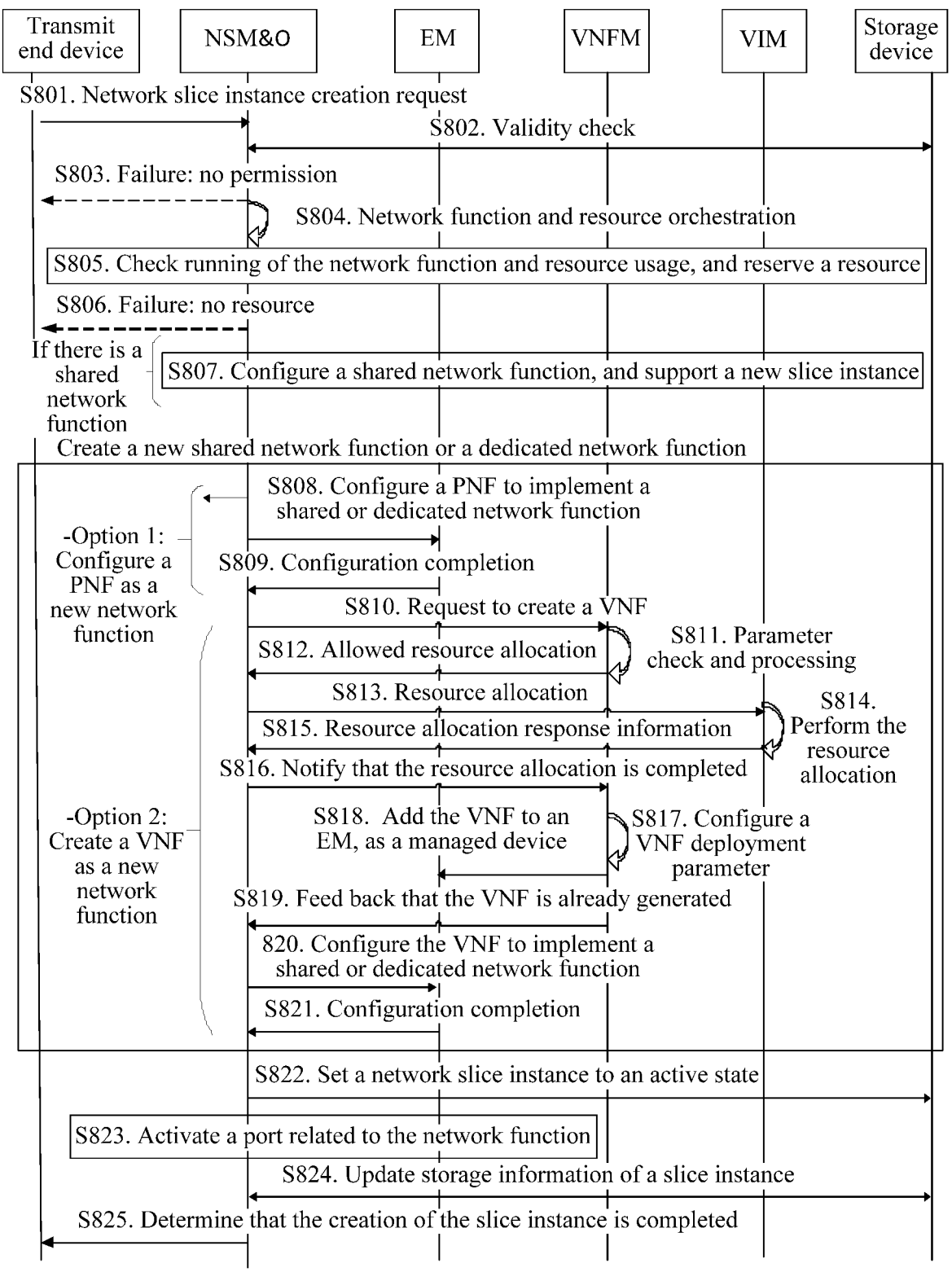
FIG. 8 is a schematic flowchart of another method for managing a network slice instance according to an embodiment of this application.

FIG. 8 is a schematic flowchart of a method 800 for managing a network slice instance according to an embodiment of this application. The method 800 is applicable to the second network management architecture shown in FIG. 4. In the method in FIG. 8, a first network device may be the NSM&O module, a second network device may be the EM module, a third network device may be the VNFM module, and a fourth network device may be the VIM module. It should be understood that, in the method 800, part S807 is a method performed when a shared network function is already run. Part S808 to part S821 are a method when a new network function needs to be generated. The newly generated network function may be a shared network function or may be a dedicated network function. Part S808 and part S809 are a method performed when the newly generated network function is a physical network function. Part S810 to part S821 are a method performed when the newly generated network function is a virtualized network function. The method 800 includes the following steps.

S801. The NSM&O module receives a network slice instance creation request from a transmit end device.

The network slice instance creation request may be used to request to create a target network slice instance. Optionally, the network slice instance creation request may carry description information of the target network slice instance. The description information may be description information of a service requirement of the target network slice instance and configuration parameter information of a network slice template of the target network slice instance.

S802. The NSM&O module interacts with the storage device, to check whether the network slice instance creation request is valid.

Specifically, the NSM&O module may send validity check information to the storage device. The validity check information may include the description information of the target network slice instance or other information. The storage device prestores user subscription information. The storage device may check, based on the user subscription information, whether the target network slice instance creation request is valid, and return the validity check response information to the NSM&O module. If the network slice instance creation request is valid, the validity check response information indicates that the network slice instance creation request is valid; or if the network slice instance creation request is invalid, the validity check response information indicates that the network slice instance creation request is invalid.

S803. When validity check response information indicates that the network slice instance creation request is invalid, the NSM&O module sends network slice instance creation response information to the transmit end device, where the network slice instance creation response information may indicate a failure of creation of a target network slice. The procedure ends. Further, the network slice instance creation response information may carry a reason for the failure of the creation, that is, no permission.

S804. When validity check response information indicates that the network slice instance creation request is valid, the NSM&O module orchestrates a network function and a resource, and determines whether a target network slice instance uses a shared network function. The orchestration of the network function and the resource may include determining a position of a network function of the target network slice in a physical network or a virtual network, determining a required network resource, and the like.

S805. The NSM&O module interacts with the EM module, the VNFM module, and the VIM module, to query for a running status of a current network function and an occupation status of the network resource, and instructs the VIM module to reserve a network resource for the target network slice instance.

S806. When a resource fails to be reserved in part S805, and a new network slice instance cannot be supported through adjustment, the NSM&O module sends network slice instance creation response information to the transmit end device, to indicate that the target network slice instance fails to be created. The procedure ends. Further, the network slice instance creation response information may carry a reason for the failure of the creation, that is, insufficient network resources.

S807. When it is determined that the network function of the target network slice includes a shared network function, and currently, the shared network function is already run in part S804, the NSM&O module sends network slice instance configuration information to the EM module, to instruct the EM module to configure the shared network function. The shared network function may be a virtualized network function or a physical network function. Further, the NSM&O module may interact with the EM module, the VNFM module, and the VIM module, to configure the shared network function for the target network slice instance, so that the shared network function supports a newly created target network slice instance. For example, configured information may include, but is not limited to: (a) a related parameter of the network slice instance, for example, an identifier of the network slice instance, a type of the network slice instance, information about the network function included in the network slice instance (for example, when the shared network function is a NAS routing network function, configuration information of the network slice instance of the shared network function needs to be obtained, to determine how to route NAS information to a corresponding network slice instance), and a parameter needing to be monitored and reported for the network slice instance; and (b) another conventional running parameter.

S808. When the network function of the target network slice includes a physical network function, the NSM&O module instructs the EM module to configure the physical network function (namely, the PNF). That is, the NSM&O module sends the network slice instance configuration information to the EM module, to instruct the EM module to configure the physical network function. When the physical network function is a dedicated network function, information needing to be configured may include, but is not limited to: (a) a related parameter of the network slice instance, for example, an identifier of the network slice instance, and a parameter needing to be monitored and reported for the network slice instance; and (b) a conventional running parameter, for example, an Internet Protocol (Internet Protocol, IP) address of a gateway and a tunnel identifier. When the physical network function is a shared network function, information needing to be configured may include, but is not limited to: an identifier of the network slice instance, a type of the network slice instance, information about the network function included in the network slice instance (for example, a newly generated shared network function may be identified, to indicate that the shared network function currently serves the target network slice instance, and may be shared with another specified type of network slice instance in the future), and a parameter needing to be monitored and reported for the network slice instance. Additionally, in addition to the related parameter of the network slice instance, the information needing to be configured may further include another conventional running parameter, for example, an MMEC and an MME pool.

S809. After completing the configuration of the physical network function of the target network slice instance, the EM module sends network slice instance creation response information to the NSM&O module, to indicate that the creation of the target network slice instance is completed. The NSM&O module receives the network slice instance creation response information sent by the EM module.

S810. When the network function of the target network slice instance is a virtualized network function, the NSM&O module sends a virtualized network function creation request to the VNFM module, to instruct the VNFM module to create the virtualized network function. The virtualized network function creation request may carry a configuration parameter of the virtualized network function. For example, the configuration parameter may include feedback information of reserving a network resource in part S804, for example, a virtual machine identifier. The configuration parameter may further include a parameter for describing a feature of the virtualized network function, for example, a virtual machine version or a computing resource requirement.

S811. After receiving the virtualized network function creation request, the VNFM module checks correctness of the configuration parameter of the virtualized network function, and authorizes to start an action of managing a lifecycle of the virtualized network function.

S812. When the VNFM module authorizes to start the action of managing the lifecycle of the virtualized network function, the VNFM module sends, to the NSM&O module, information indicating allowed resource allocation, to indicate that the NSM&O module is allowed to allocate a resource. Further, the VNFM module may modify the configuration parameter of the virtualized network function, and add a modified configuration parameter to the information indicating allowed resource allocation.

S813. The NSM&O module sends a resource allocation request to the VIM module. The resource allocation request is used to request the VIM module to allocate a network resource corresponding to the virtualized network function to the target network slice instance. Further, if the information indicating allowed resource allocation in part S112 carries the modified configuration parameter of the virtualized network function, the NSM&O module needs to modify the virtualized network function based on a modification indication, and then sends the resource allocation request to the VIM module.

S814. The VIM module performs a resource allocation process based on the resource allocation request of the NSM&O module.

S815. After completing the resource allocation, the VIM module sends resource allocation response information to the NSM&O module, to indicate that the allocation of the network resource corresponding to the virtualized network function is completed. The NSM&O module receives the resource allocation response information.

S816. After receiving the resource allocation response information, the NSM&O module sends resource allocation acknowledgement information to the VNFM module, to indicate, to the VNFM module, that the allocation of the network resource is completed, so that the VNFM performs a process of configuring the virtualized network function. The VNFM module receives the resource allocation response information.

S817. After receiving the resource allocation acknowledgement information, the VNFM module configures a deployment related parameter for the virtualized network function, for example, configures an IP address of the virtualized network function or an identifier of the virtualized network function.

S818. After completing the configuration of the deployment parameter of the virtualized network function, the VNFM module sends a virtualized network function addition request to the EM module, to request the EM module to add the configured virtualized network function as a managed device. The EM module receives the virtualized network function request, and adds the virtualized network function as a managed device.

S819. After completing the configuration of the deployment parameter of the virtualized network function, the VNFM module sends virtualized network function creation response information to the NSM&O module, to indicate that the creation of the virtualized network function of the target network slice instance is completed. The NSM&O module receives the virtualized network function creation response information.

S820. After receiving the virtualized network function creation response information, the NSM&O module may learn that the creation of the virtualized network function is already completed. Therefore, the NSM&O module may configure a parameter of the virtualized network function that is related to the target network slice instance. The NSM&O module sends network function configuration indication information to the EM module, to instruct to configure the virtualized network function. Specifically, for a dedicated network function, information needing to be configured may include, but is not limited to: (a) a related parameter of the network slice instance, for example, an identifier of the network slice instance, and a parameter needing to be monitored and reported for the network slice instance; and (b) a conventional running parameter, for example, an Internet Protocol (Internet Protocol, "IP" for short) address of a gateway and a tunnel identifier. When the physical network function is a shared network function, information needing to be configured may include, but is not limited to: an identifier of the network slice instance, a type of the network slice instance, information about the network function included in the network slice instance (for example, a newly generated shared network function may be identified, to indicate that the shared network function currently serves the target network slice instance, and may be shared with another specified type of network slice instance in the future), and a parameter needing to be monitored and reported for the network slice instance. Additionally, in addition to the related parameter of the network slice instance, the information needing to be configured may further include another conventional running parameter, for example, an MMEC and an MME pool.

S821. After completing the configuration of the virtualized network function, the EM module may send network function configuration response information to the NSM&O module, to indicate that the configuration of the virtualized network function is completed. The NSM&O module receives the network function configuration response information.

S822. The NSM&O module sends a network slice instance activation indication to the storage device, to instruct to set the target network slice instance to an active state.

S823. The NSM&O module sends a network function port activation indication to the EM module, to activate a port for the network function of the target network slice instance, to start data sending or receiving through a port related to the virtualized network function or the physical network function.

S824. The NSM&O module interacts with the storage device, to store parameter information of a newly generated target network slice instance into the storage device. For example, the parameter information may include a shared network function of the target network slice instance or a type of a network slice instance that can share a network function with the target network slice instance.

S825. The NSM&O module sends network slice instance creation response information to the transmit end device, to indicate that the creation of the network slice instance is completed. The procedure ends. Optionally, if the target network slice includes only a shared network function and the shared network function is already run, part S825 may be performed after S807. If the network function included in the target network slice is a newly generated network function, and the network function is a physical network function, part S825 may be performed after S809.

It should be understood that sequence numbers of the foregoing processes do not mean execution sequences. The execution sequences of the processes should be determined based on functions and internal logic of the processes, and should not be construed as any limitation on the implementation processes of this embodiment of this application.

In the embodiment in FIG. 8, the process of creating the network slice instance in the second network management architecture is shown. The NSM&O module can flexibly orchestrate and manage the network function of the network slice instance and the network resource, thereby improving efficiency of managing the network slice instance.

Figure 9:
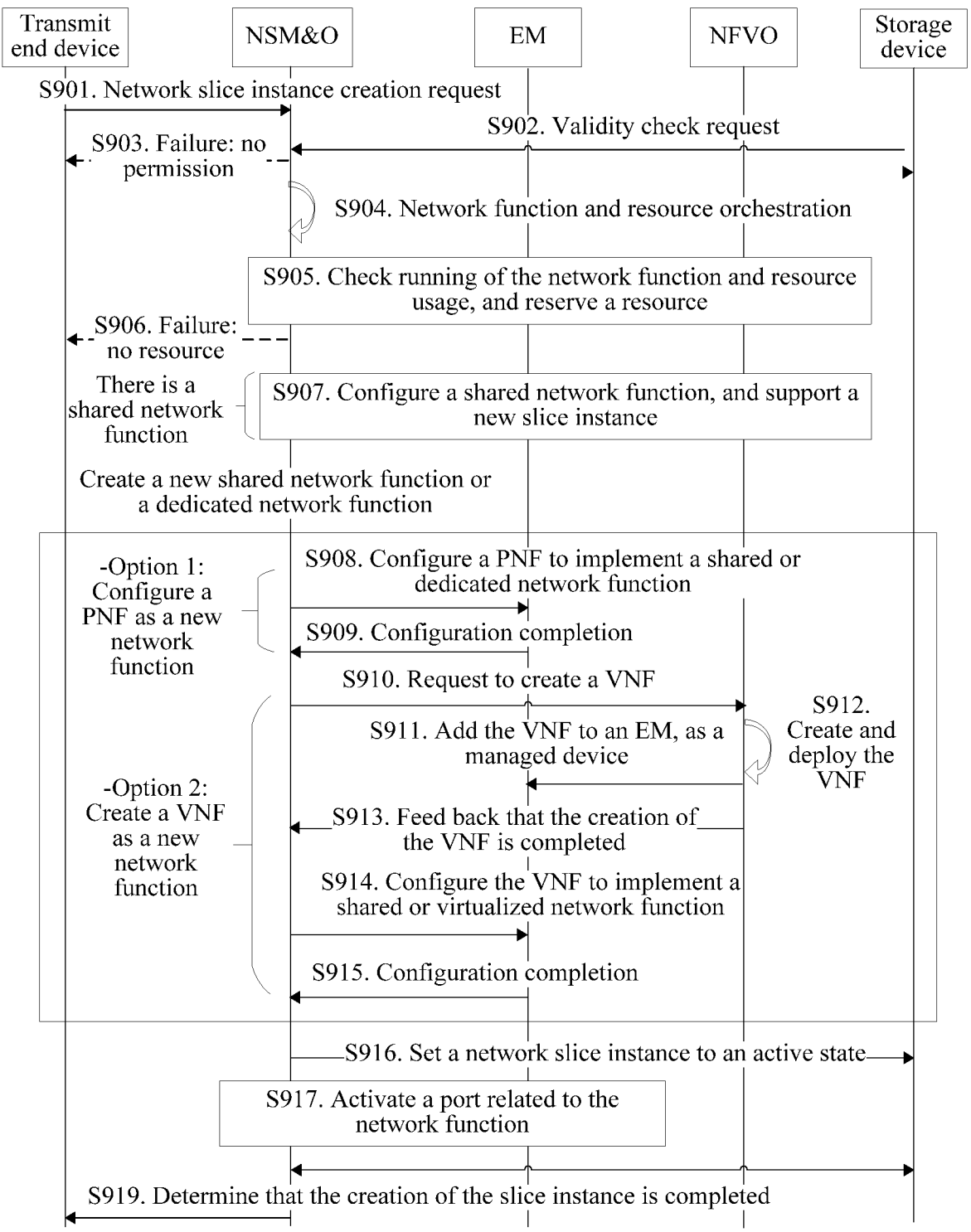
FIG. 9 is a schematic flowchart of another method for managing a network slice instance according to an embodiment of this application.

FIG. 9 is a schematic flowchart of a method 900 for managing a network slice instance according to another embodiment of this application. The method 900 is applicable to the first network management architecture shown in FIG. 3. However, this embodiment of this application is not limited thereto. In the method in FIG. 9, a first network device may be the NSM&O module, a second network device may be the EM module, a third network device may be the NVFO module, and a fourth network device may be the VIM module. For content of the method in FIG. 9 that is the same as or similar to that in FIG. 8, for brevity, details are not described herein again.

The first network management architecture to which the method in FIG. 9 is applied includes the NFVO module, that is, the NFVO module and the NSM&O module in FIG. 9 are independent of each other, while the NSM&O module in the second network management architecture to which the method in FIG. 8 is applied includes a function of the NFVO module, and the NSM&O module and the NFVO module are a same module. Therefore, a difference between the method 900 and the method 800 lies in that: in part S910, the NSM&O module sends a virtualized network function creation request to the NFVO module instead of sending a virtualized network function creation request to the VNFM module, and then the NFVO module is responsible for a process of creating a virtualized network function. Additionally, processes of interaction between the NSM&O module and the VNFM module and between the NSM&O module and the VIM module in the method 800 are specifically performed by the NVFO module under the instruction of the NSM&O module in the method 900. The method 900 includes the following steps:

Part S901 to part S909 are the same as or similar to part S801 to part S809 in FIG. 8. Details are not described herein again.

S910. The NSM&O module sends a virtualized network function creation request to the NFVO module. The NFVO module receives the virtualized network function creation request.

S911. The NFVO module interacts with the VNFM module and the VIM module, to complete creation of a virtualized network function.

S912. The NFVO module sends a virtualized network function addition request to the EM module, to request the EM module to add the configured virtualized network function as a managed device. The EM module receives the virtualized network function request, and adds the virtualized network function as a managed device.

S913. The NFVO module sends virtualized network function creation response information to the NSM&O module, to indicate that the creation of the virtualized network function of the target network slice instance is completed. The NSM&O module receives the virtualized network function creation response information.

S914. After receiving the virtualized network function creation response information, the NSM&O module sends network function configuration indication information to the EM module, to instruct to configure the virtualized network function.

S915. After completing the configuration of the virtualized network function, the EM module may send network function configuration response information to the NSM&O module, to indicate that the configuration of the virtualized network function is completed. The NSM&O module receives the network function configuration response information.

S916. The NSM&O module sends a network slice instance activation indication to the storage device, to instruct to set the target network slice instance to an active state.

S917. The NSM&O module sends a network function port activation indication to the EM module, to activate a port for the network function of the target network slice instance, to start data sending or receiving through a port related to the virtualized network function or the physical network function.

S918. The NSM&O module interacts with the storage device, to store parameter information of a newly generated target network slice instance into the storage device. For example, the parameter information may include a shared network function of the target network slice instance or a type of a network slice instance that can share a network function with the target network slice instance.

S919. The NSM&O module sends network slice instance creation response information to the transmit end device, to indicate that the creation of the network slice instance is completed. The procedure ends. Optionally, if the target network slice includes only a shared network function and the shared network function is already run, part S919 may be performed after S907. If the network function included in the target network slice is a newly generated network function, and the network function is a physical network function, part S919 may be performed after S909.

Part S914 to part S919 are the same as or similar to part S820 to part S825 in FIG. 8. For the purpose of brevity, partial description content is omitted.

It should be understood that sequence numbers of the foregoing processes do not mean execution sequences. The execution sequences of the processes should be determined based on functions and internal logic of the processes, and should not be construed as any limitation on the implementation processes of this embodiment of this application.

In the embodiment in FIG. 9, the process of creating the network slice instance in the first network management architecture is shown. The NSM&O module can flexibly orchestrate and manage the network function of the network slice instance and the network resource, thereby improving efficiency of managing the network slice instance.

Figure 10:
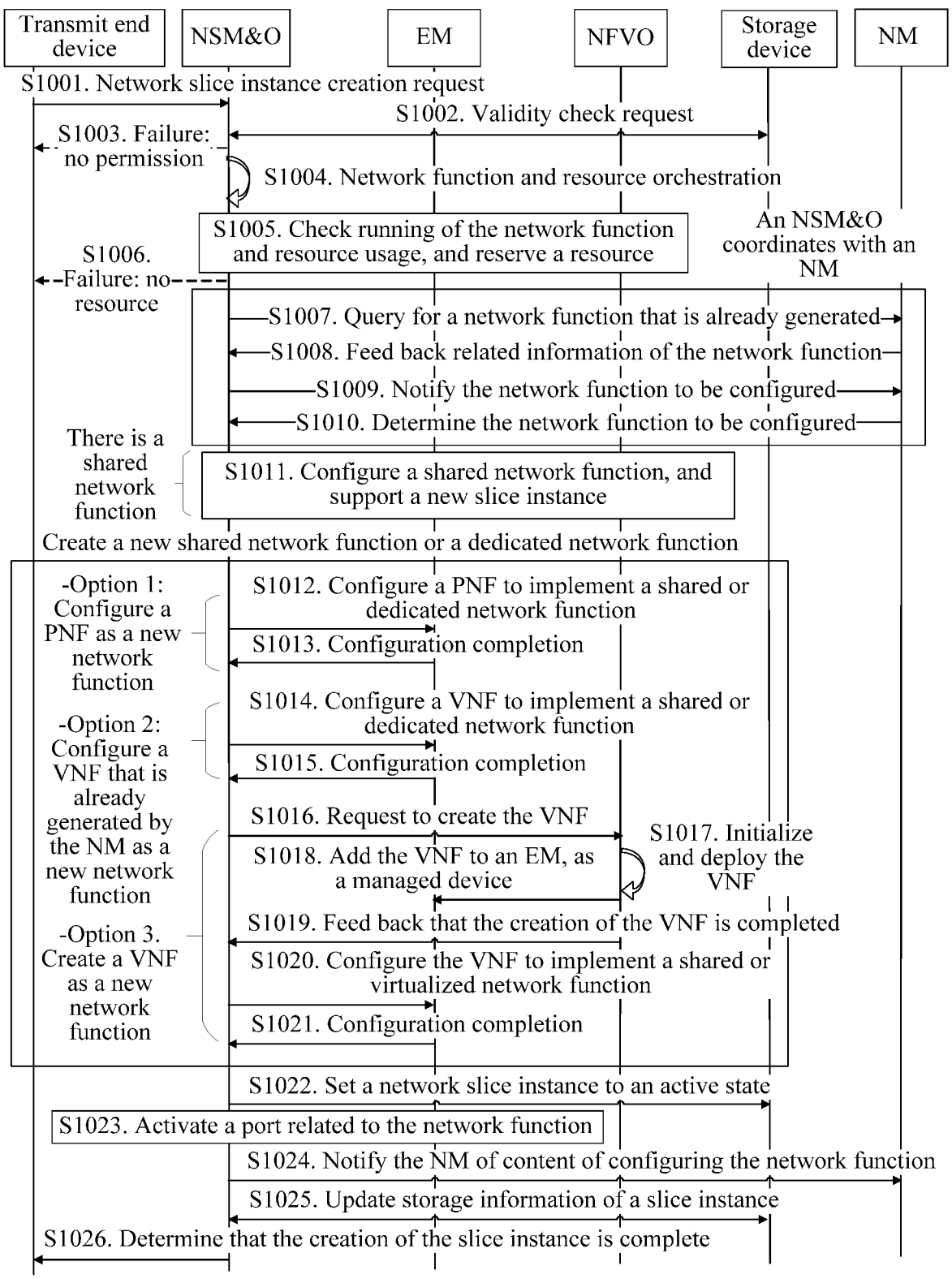
FIG. 10 is a schematic flowchart of another method for managing a network slice instance according to an embodiment of this application.

FIG. 10 is a schematic flowchart of a method 1000 for managing a network slice instance according to another embodiment of this application. The method 1000 is applicable to the third network management architecture shown in FIG. 5. However, this embodiment of this application is not limited thereto. In the method in FIG. 10, a first network device may be the NSM&O module, a second network device may be the EM module, a third network device may be the NVFO module, a fourth network device may be the VIM module, and a fifth network device may be the NM module. For content of the method in FIG. 10 that is the same as or similar to that in FIG. 8 or FIG. 9, for brevity, refer to content of a corresponding part in FIG. 8 or FIG. 9. Details are not described herein again.

A difference between the third network management architecture to which the method in FIG. 10 is applied and the first network management architecture to which the method in FIG. 9 is applied lies in that: the NSM&O module in the first network management architecture includes a function of the NM module, while the NSM&O module and the NM module in the third network management architecture are independent of each other. Therefore, the NSM&O module and the NM module in FIG. 10 both can manage a physical network function, and the NSM&O module and the NM module both can manage a virtualized network function by using the NFVO module. Therefore, to avoid a configuration conflict, in the method 1000, the NSM&O module and the NM module need to coordinate a process of configuring a network function. Part S1007 to part S1010, and part S1024 in the method 1000 are the process of coordinating configuration of the network function. Part S1014 and part S1015 are a process in which the NSM&O module configures, by using the NM module, a virtualized network function that is already generated. The method 1000 includes the following steps:

Part S1001 to part S1006 are the same as or similar to part S801 to part S806 in FIG. 8. Refer to corresponding content of the method in FIG. 8, and details are not described herein again.

S1007. The NSM&O module sends network function query information to the NM module, to query for a network function that is already generated by the NM module. The network function may be a virtualized network function. The NM module receives the network function query information. The network that is already generated includes two types: a first type is a network function that is currently run; and a second type is a network function that is already generated but is not run. Because the physical network function can be directly managed by the NSM&O module, a configuration parameter of the NM module for the virtualized network function at a network level may be stored only in the NM module, the NM needs to be queried for a configuration status related to the virtualized network function.

S1008. The NM module sends network function feedback information to the NSM&O module, to indicate the network function generated by the NM module and a related parameter, so that the NSM&O performs coordinated configuration on the network function. The NSM&O module receives the network function feedback information. Optionally, the NSM&O module may configure the network function that is already generated by the NM module, thereby improving resource utilization efficiency.

S1009. The NSM&O module sends network function notification information to the NM module, to indicate the network function to be configured by the NSM&O module, where the network function may include a physical network function or a virtualized network function, to avoid a conflict caused when the NM module and the NSM&O module both configure the network function. The NM module receives the network function notification information.

S1010. The NM module sends network function response information to the NSM&O module, to indicate that the NM module already determines the network function to be configured by the NSM&O module. The NSM&O module receives the network function response information.

S1011. When it is determined that the network function of the target network slice includes a shared network function, and currently, the shared network function is already run in part 1004, the NSM&O module sends network slice instance configuration information to the EM module, to instruct the EM module to configure the shared network function. The shared network function may be a virtualized network function or a physical network function. Further, the NSM&O module may interact with the EM module and the NFVO module, to configure the shared network function for the target network slice instance, so that the shared network function supports a newly created target network slice instance. For example, configured information may include, but is not limited to: (a) a related parameter of the network slice instance, for example, an identifier of the network slice instance, a type of the network slice instance, information about the network function included in the network slice instance (for example, when the shared network function is a NAS routing network function, configuration information of the network slice instance of the shared network function needs to be obtained, to determine how to route NAS information to a corresponding network slice instance), and a parameter needing to be monitored and reported for the network slice instance; and (b) another conventional running parameter.

S1012. When the network function of the target network slice includes a physical network function, the NSM&O module instructs the EM module to configure the physical network function (namely, the PNF). That is, the NSM&O module sends network slice instance configuration information to the EM module, to instruct the EM module to configure the physical network function.

S1013. After completing the configuration of the physical network function of the target network slice instance, the EM module sends network slice instance creation response information to the NSM&O module, to indicate that the creation of the target network slice instance is completed. The NSM&O module receives the network slice instance creation response information sent by the EM module.

S1014. The NSM&O module sends network function configuration indication information to the EM module, to instruct the EM module to configure, by using the NM module, the virtualized network function that is already generated. Specific configuration content is the same as part S820 in FIG. 8. Further, the NSM&O module may interact with the NFVO module, to modify and configure the virtualized network function that is already generated.

S1015. The NSM&O module receives network function configuration response information sent by the EM module, to indicate that the configuration of the already generated virtualized network function of the target network slice instance is completed.

S1016. When the network function of the target network slice instance is a virtualized network function, the NSM&O module sends a virtualized network function creation request to the NFVO module. The NFVO module receives the virtualized network function creation request.

S1017. The NFVO module interacts with the VNFM module and the VIM module, to complete creation of the virtualized network function.

S1018. The NFVO module sends a virtualized network function addition request to the EM module, to request the EM module to add the configured virtualized network function as a managed device. The EM module receives the virtualized network function request, and adds the virtualized network function as a managed device.

S1019. The NFVO module sends virtualized network function creation response information to the NSM&O module, to indicate that the creation of the virtualized network function of the target network slice instance is completed. The NSM&O module receives the virtualized network function creation response information.

S1020. After receiving the virtualized network function creation response information, the NSM&O module may configure a parameter of the virtualized network function that is related to the target network slice instance. The NSM&O module sends network function configuration indication information to the EM module, to instruct to configure the virtualized network function.

S1021. After completing the configuration of the virtualized network function, the EM module may send network function configuration response information to the NSM&O module, to indicate that the configuration of the virtualized network function is completed. The NSM&O module receives the network function configuration response information.

S1022. The NSM&O module sends a network slice instance activation indication to the storage device, to instruct to set the target network slice instance to an active state.

S1023. The NSM&O module sends a network function port activation indication to the EM module.

S1024. The NSM&O module sends network function configuration feedback notification information to the NM module, to indicate, to the NSM&O module, specific configuration content of the network function.

S1025. The NSM&O module interacts with the storage device, to store parameter information of a newly generated target network slice instance into the storage device.

S1026. The NSM&O module sends network slice instance creation response information to the transmit end device, to indicate that the creation of the network slice instance is completed. The procedure ends.

Part S1016 to part S1026 are the same as or similar to part S910 to part S919 in FIG. 9. For the purpose of brevity, partial description content is omitted.

It should be understood that sequence numbers of the foregoing processes do not mean execution sequences. The execution sequences of the processes should be determined based on functions and internal logic of the processes, and should not be construed as any limitation on the implementation processes of this embodiment of this application.

In the embodiment in FIG. 10, the process of creating the network slice instance in the third network management architecture is shown. The NSM&O module can flexibly orchestrate and manage the network function of the network slice instance and the network resource, thereby improving efficiency of managing the network slice instance.

Figure 11A:
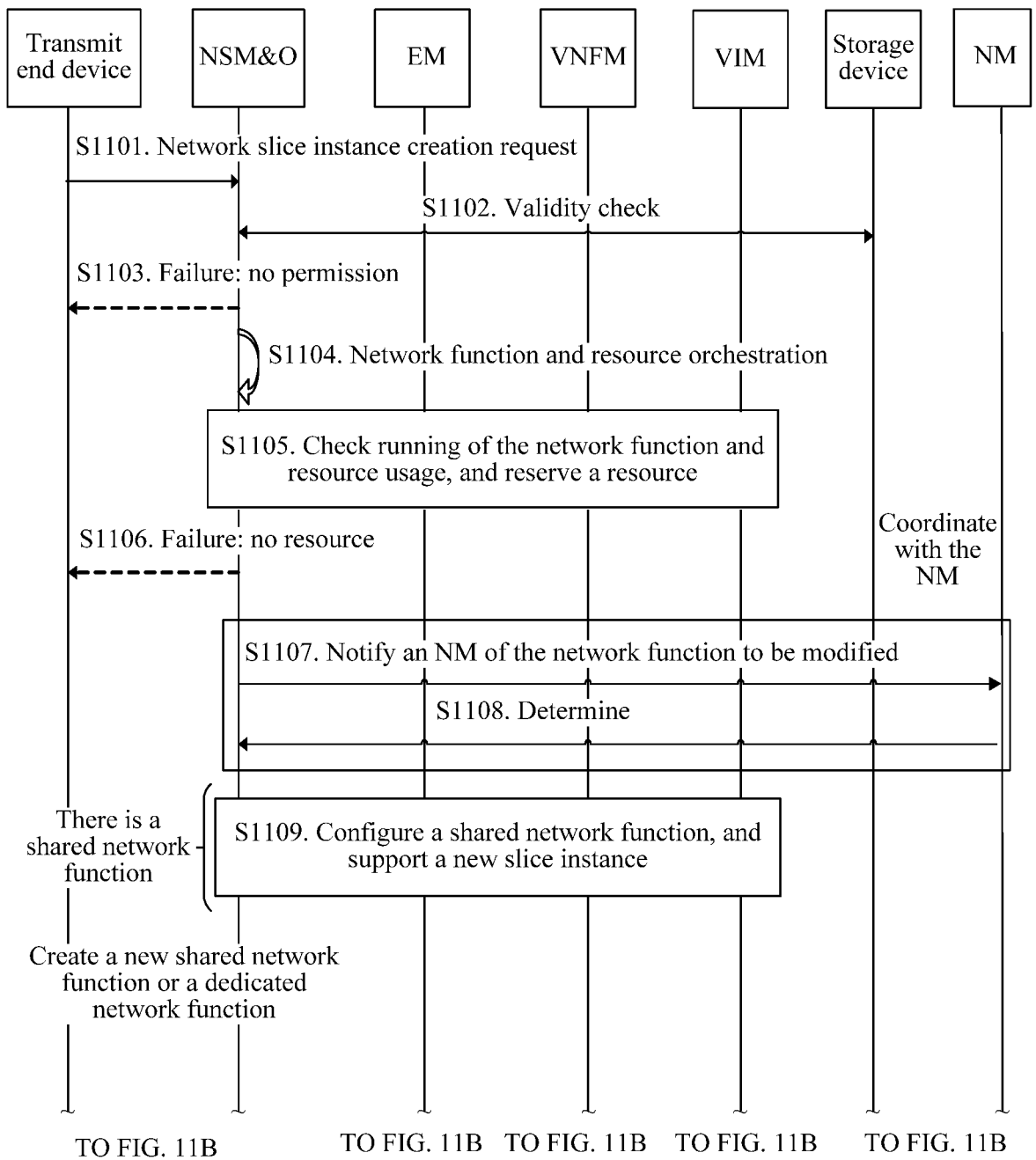
FIG. 11A and FIG. 11B are a schematic flowchart of another method for managing a network slice instance according to an embodiment of this application.
Figure 11B:
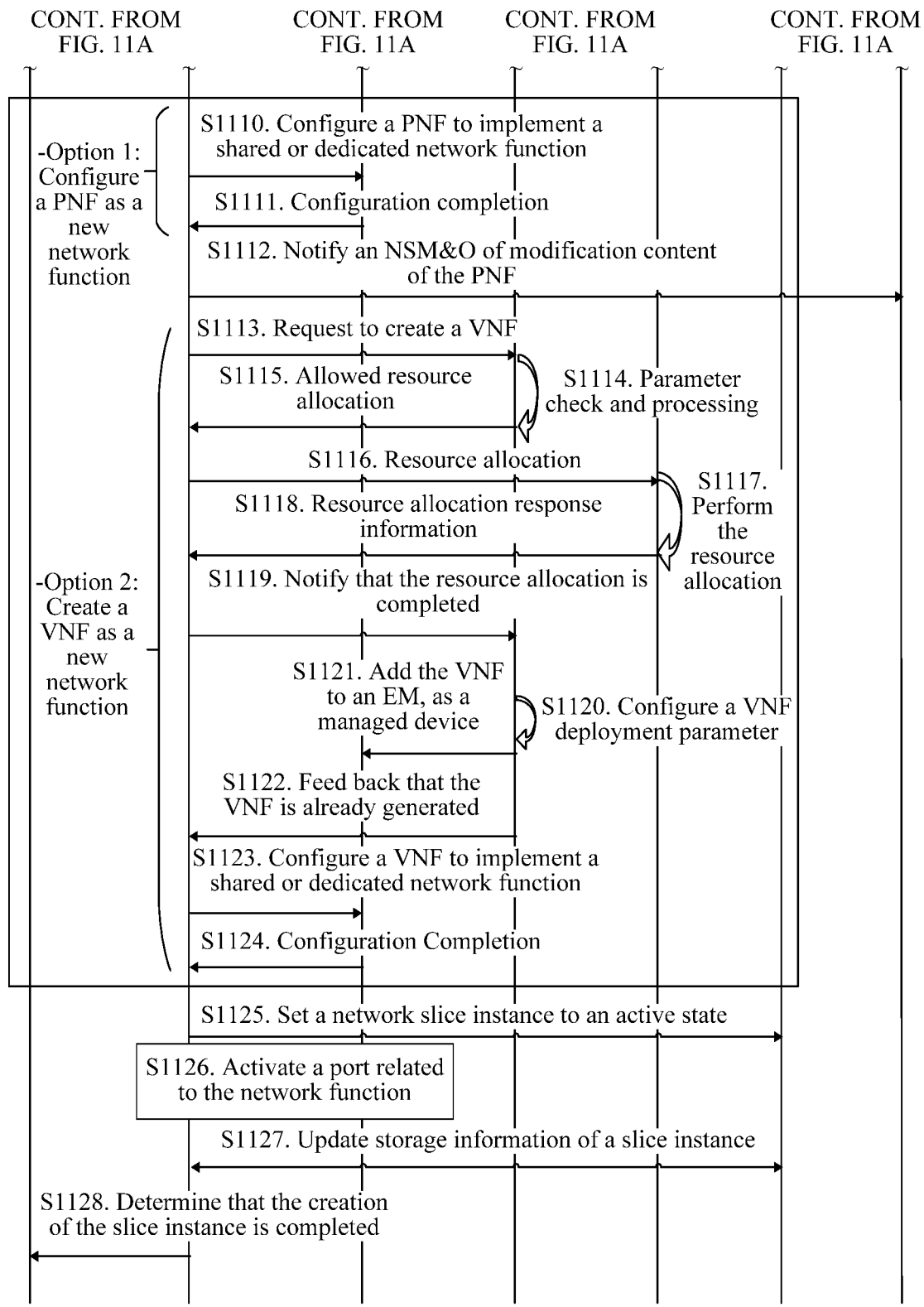

FIG. 11A and FIG. 11B are a schematic flowchart of a method 1100 for managing a network slice instance according to another embodiment of this application. The method 1100 is applicable to the fourth network management architecture shown in FIG. 6. However, this embodiment of this application is not limited thereto. In the method in FIG. 11A and FIG. 11B, a first network device may be the NSM&O module, a second network device may be the EM module, a third network device may be the NVFO module, a fourth network device may be the VIM module, and a fifth network device may be the NM module. For same or similar content of the method in FIG. 11A and FIG. 11B and the methods in FIG. 8 to FIG. 10, for brevity, refer to content of a corresponding part in FIG. 8 to FIG. 10. Details are not described herein again.

A difference between the fourth network management architecture to which the method in FIG. 11A and FIG. 11B is applied and the second network management architecture to which the method in FIG. 8 is applied lies in that: the NSM&O module in the second network management architecture includes a function of the NM module, while the NSM&O module and the NM module in the fourth network management architecture are independent of each other. Therefore, the NSM&O module and the NM module in FIG. 11A and FIG. 11B both can manage a physical network function. Therefore, to avoid a configuration conflict, in the method 1100, the NSM&O module and the NM module need to coordinate a process of configuring the physical network function. Part S1107, part S1108, and part S1112 in the method 1100 are content of coordinating the physical network function. Additionally, the NSM&O module in the fourth network management architecture is further responsible for managing a virtualized network function, and the NM module does not need to manage the virtualized network function. The method 1100 includes the following steps:

Part S1101 to part S1106 are the same as or similar to part S801 to part S806 in FIG. 8. Refer to corresponding content of the method in FIG. 8, and details are not described herein again.

S1107. The NSM&O module sends network function notification information to the NM module, to indicate a network function to be configured by the NSM&O module.

The network function may include a physical network function. The NM module receives the network function notification information.

S1108. The NM module sends network function response information to the NSM&O module, to indicate that the NM module already determines the network function to be configured by the NSM&O module. The NSM&O module receives the network function response information.

S1109. When it is determined that the network function of the target network slice includes a shared network function, and currently, the shared network function is already run in part 1104, the NSM&O module sends network slice instance configuration information to the EM module, to instruct the EM module to configure the shared network function. The shared network function may be a virtualized network function or a physical network function. Further, the NSM&O module may interact with the EM module and the NFVO module, to configure the shared network function for the target network slice instance, so that the shared network function supports a newly created target network slice instance. For example, configured information may include, but is not limited to: (a) a related parameter of the network slice instance, for example, an identifier of the network slice instance, a type of the network slice instance, information about the network function included in the network slice instance (for example, when the shared network function is a NAS routing network function, configuration information of the network slice instance of the shared network function needs to be obtained, to determine how to route NAS information to a corresponding network slice instance), and a parameter needing to be monitored and reported for the network slice instance; and (b) another conventional running parameter.

S1110. When the network function of the target network slice includes a physical network function, the NSM&O module instructs the EM module to configure the physical network function (namely, the PNF). That is, the NSM&O module sends network slice instance configuration information to the EM module, to instruct the EM module to configure the physical network function.

S1111. After completing the configuration of the physical network function of the target network slice instance, the EM module sends network slice instance creation response information to the NSM&O module, to indicate that the creation of the target network slice instance is completed. The NSM&O module receives the network slice instance creation response information sent by the EM module.

S1112. The NSM&O module sends network function configuration feedback notification information to the NM, to indicate, to the NSM&O module, specific configuration content of the physical network function.

S1113. When the network function of the target network slice instance is a virtualized network function, the NSM&O module sends a virtualized network function creation request to the VNFM module, to instruct the VNFM module to create the virtualized network function.

S1114. After receiving the virtualized network function creation request, the VNFM module checks correctness of the configuration parameter of the virtualized network function, and authorizes to start an action of managing a lifecycle of the virtualized network function.

S1115. When the VNFM module authorizes to start the action of managing the lifecycle of the virtualized network function, the VNFM module sends, to the NSM&O module, information indicating allowed resource allocation, to indicate that the NSM&O module is allowed to allocate a resource.

S1116. The NSM&O module sends a resource allocation request to the VIM module. The resource allocation request is used to request the VIM module to allocate a network resource corresponding to the virtualized network function to the target network slice instance.

S1117. The VIM module performs a resource allocation process based on the resource allocation request of the NSM&O module.

S1118. After completing the resource allocation, the VIM module sends resource allocation response information to the NSM&O module, to indicate that the allocation of the network resource corresponding to the virtualized network function is completed. The NSM&O module receives the resource allocation response information.

S1119. After receiving the resource allocation response information, the NSM&O module sends resource allocation acknowledgement information to the VNFM module, to indicate, to the VNFM module, that the allocation of the network resource is completed, so that the VNFM performs a process of configuring the virtualized network function. The VNFM module receives the resource allocation response information.

S1120. After receiving the resource allocation acknowledgement information, the VNFM module configures a deployment related parameter for the virtualized network function, for example, configures an IP address of the virtualized network function or an identifier of the virtualized network function.

S1121. After completing the configuration of the deployment parameter of the virtualized network function, the VNFM module sends a virtualized network function addition request to the EM module, to request the EM module to add the configured virtualized network function as a managed device. The EM module receives the virtualized network function request, and adds the virtualized network function as a managed device.

S1122. After completing the configuration of the deployment parameter of the virtualized network function, the VNFM module sends virtualized network function creation response information to the NSM&O module, to indicate that the creation of the virtualized network function of the target network slice instance is completed. The NSM&O module receives the virtualized network function creation response information.

S1123. After receiving the virtualized network function creation response information, the NSM&O module may learn that the creation of the virtualized network function is already completed. Therefore, the NSM&O module may configure a parameter of the virtualized network function that is related to the target network slice instance. The NSM&O module sends network function configuration indication information to the EM module, to instruct to configure the virtualized network function.

S1124. After completing the configuration of the virtualized network function, the EM module may send network function configuration response information to the NSM&O module, to indicate that the configuration of the virtualized network function is completed. The NSM&O module receives the network function configuration response information.

S1125. The NSM&O module sends a network slice instance activation indication to the storage device, to instruct to set the target network slice instance to an active state.

S1126. The NSM&O module sends a network function port activation indication to the EM module, to activate a port for the network function of the target network slice instance, to start data sending or receiving through a port related to the virtualized network function or the physical network function.

S1127. The NSM&O module interacts with the storage device, to store parameter information of a newly generated target network slice instance into the storage device.

S1128. The NSM&O module sends network slice instance creation response information to the transmit end device, to indicate that the creation of the network slice instance is completed. The procedure ends.

Part S1113 to part S1128 are the same as or similar to part S810 to part S825 in FIG. 9. For the purpose of brevity, partial description content is omitted.

It should be understood that sequence numbers of the foregoing processes do not mean execution sequences. The execution sequences of the processes should be determined based on functions and internal logic of the processes, and should not be construed as any limitation on the implementation processes of this embodiment of this application.

In the embodiment in FIG. 11A and FIG. 11B, the process of creating the network slice instance in the fourth network management architecture is shown. The NSM&O module can flexibly orchestrate and manage the network function of the network slice instance and the network resource, thereby improving efficiency of managing the network slice instance.

Figure 12:
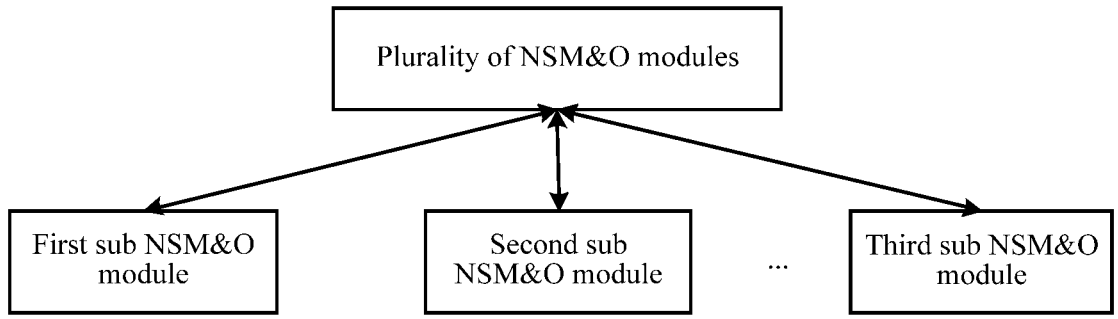
FIG. 12 is a diagram of a hierarchy of an NSM&O according to an embodiment of this application.

Methods for creating a network slice instance in a plurality of network management architectures in the embodiments of this application are described above. The NSM&O module may be a physical module in the network management architecture, or may be a plurality of physical modules having a hierarchy. For example, FIG. 12 is a schematic structural diagram of an NSM&O module according to another embodiment of this application. As shown in FIG. 12, the NSM&O module may include a plurality of NSM&O modules and is used as a general control and orchestration module, and can manage sub NSM&O modules in a plurality of domains. When receiving a network slice instance creation request from a transmit end device, the plurality of NSM&O modules may analyze the network slice instance creation request, to divide an entire network slice instance into a plurality of sub network slice instances. For example, one network slice instance may be divided into a core network sub slice instance and a radio access network (Radio Access Network, RAN) sub slice instance. Alternatively, one network slice instance may be divided into sub network slice instances provided by a plurality of different operator (vendor) devices. The plurality of NSM&O modules may instruct each sub NSM&O module to generate a corresponding sub network slice instance. Description information of the sub network slice instance is the same as or similar to description information of the entire network slice instance. For example, the description information may include a network function, a connection relationship between network functions, a KPI indicator, and a running parameter needing to be monitored, or may not include the specific information, and only a service requirement of the sub network slice instance needs to be sent to a sub NSM&O module. How to specifically generate a sub network slice is determined by the sub NSM&O module.

Figure 13:
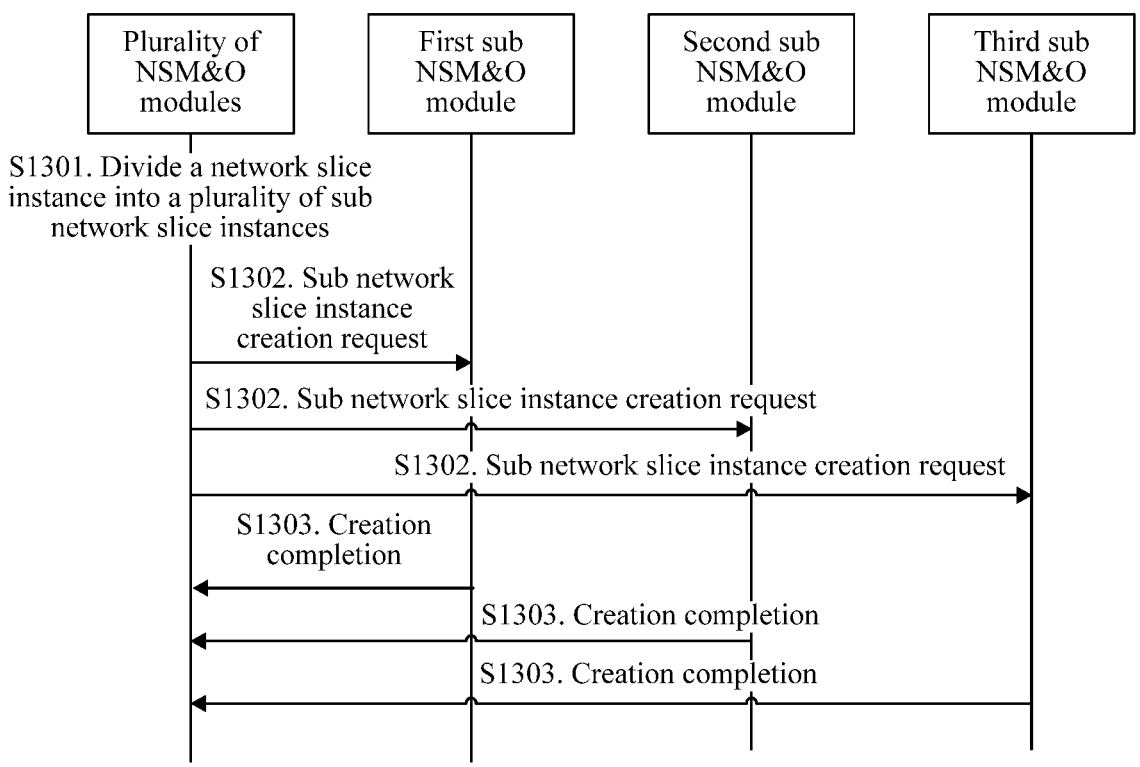
FIG. 13 is a schematic flowchart of application to an NSM&O according to an embodiment of this application.

In a process of generating the sub network slice instance, the sub NSM&O module may exchange information with the plurality of NSM&O modules. FIG. 13 shows a process of interaction between the plurality of NSM&O modules and the sub NSM&O module. FIG. 13 includes three sub NSM&O modules: a first sub NSM&O module, a second sub NSM&O module, and a third sub NSM&O module.

S1301. The plurality of NSM&O modules divide the network slice instance into a plurality of sub network slice instances.

S1302. The plurality of NSM&O modules respectively send a sub network slice instance creation request to the plurality of sub NSM&O modules, to create corresponding sub network slice instances. The plurality of sub NSM&O modules receive the sub network slice instance creation request.

S1303. The plurality of sub NSM&O modules send sub network slice instance creation response information to the plurality of NSM&O modules, to indicate that the creation of the corresponding sub network slice instances is completed.

In this embodiment of this application, the NSM&O module may have a hierarchy, and an entire network slice instance may be divided into a plurality of sub network slice instances for management, to flexibly adapt to features of a plurality of domains and a plurality of operators in network management.

The method for managing a network slice instance according to the embodiments of this application is described in detail above with reference to FIG. 1 to FIG. 13. An apparatus for managing a network slice instance according to an embodiment of this application is described in detail below with reference to FIG. 14 to FIG. 23.

Figure 14:
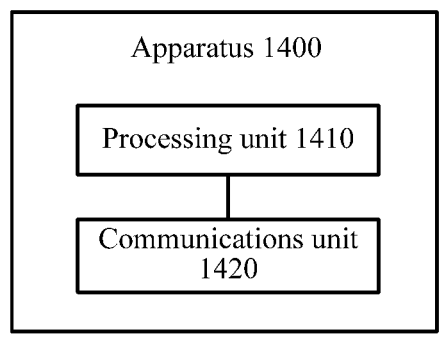
FIG. 14 is a schematic block diagram of an apparatus for managing a network slice instance according to an embodiment of this application.

FIG. 14 shows an apparatus 1400 for managing a network slice instance according to an embodiment of this application. The apparatus 1400 may be a first network device, and the apparatus 1400 includes a processing unit 1410 and a communications unit 1420.

The processing unit 1410 is configured to: receive a network slice instance creation request from a transmit end device through the communications unit 1420, where the network slice instance creation request is used to request to create a target network slice instance, and the network slice instance creation request includes description information of the target network slice instance; send network function configuration indication information to a second network device through the communications unit 1420 based on the description information, where the network function configuration indication information is used to instruct the second network device to configure a network function of the target network slice instance; receive, through the communications unit 1420, network function configuration response information sent by the second network device, where the network function configuration response information indicates that the configuration of the network function of the target network slice instance is completed; and send network slice instance creation response information to the transmit end device through the communications unit 1420, where the network slice instance creation response information indicates that the creation of the target network slice instance is completed.

In this embodiment of this application, the first network device instructs the second network device to configure the network function of the network slice instance, to manage a creation process of the network slice instance, thereby automatically creating the network slice instance, and improving efficiency of managing the network slice instance.

It should be understood that the apparatus 1400 herein is embodied in the form of functional units. The term "unit" herein may be an application-specific integrated circuit (Application Specific Integrated Circuit, ASIC), an electronic circuit, a processor for performing one or more software or firmware programs (for example, a shared processor, a proprietary processor, or a packet processor), a memory, a combined logic circuit, and/or another appropriate component supporting the described function. In an optional example, a person skilled in the art may understand that the apparatus 1400 may be the first network device in the foregoing embodiments, and the apparatus 1400 may be configured to perform the procedures and/or steps corresponding to the first network device in the foregoing method embodiments. To avoid repetition, details are not described herein again.

Figure 15:
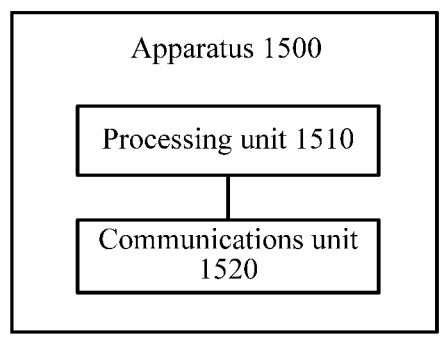
FIG. 15 is a schematic block diagram of another apparatus for managing a network slice instance according to an embodiment of this application.

FIG. 15 shows another apparatus 1500 for managing a network slice instance according to an embodiment of this application. The apparatus 1500 may be a second network device, and the apparatus 1500 includes a processing unit 1510 and a communications unit 1520.

The processing unit 1510 is configured to receive, through the communications unit 1520, network slice configuration information sent by a first network device, where the network slice configuration information is used to instruct the second network device to configure a network function of a target network slice; and send network slice configuration response information to the first network device through the communications unit 1520, where the network slice configuration response information indicates that the configuration of the network function corresponding to the target network slice is completed.

In this embodiment of this application, the second network device receives an indication of the first network device and configures the network function of the network slice instance, to manage a creation process of the network slice instance, thereby automatically creating the network slice instance, and improving efficiency of managing the network slice instance.

It should be understood that the apparatus 1500 herein is embodied in the form of functional units. The term "unit" herein may be an application-specific integrated circuit (Application Specific Integrated Circuit, ASIC), an electronic circuit, a processor for performing one or more software or firmware programs (for example, a shared processor, a proprietary processor, or a packet processor), a memory, a combined logic circuit, and/or another appropriate component supporting the described function. In an optional example, a person skilled in the art may understand that the apparatus 1500 may be the second network device in the foregoing embodiments, and the apparatus 1500 may be configured to perform the procedures and/or steps corresponding to the second network device in the foregoing method embodiments. To avoid repetition, details are not described herein again.

Figure 16:
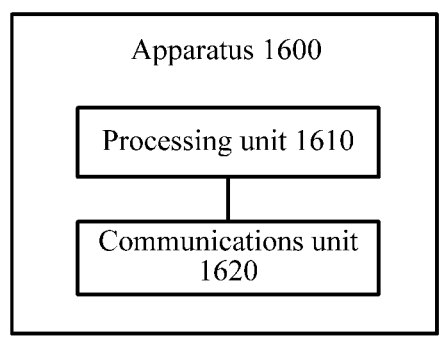
FIG. 16 is a schematic block diagram of another apparatus for managing a network slice instance according to an embodiment of this application.

FIG. 16 shows another apparatus 1600 for managing a network slice instance according to an embodiment of this application. The apparatus 1600 may be a third network device, and the apparatus 1600 includes a processing unit 1610 and a communications unit 1620.

The processing unit 1610 is configured to: receive, through the communications unit 1620, a virtualized network function creation request sent by a first network device, where the virtualized network function creation request is used to instruct the third network device to create the virtualized network function of the target network slice instance; and send virtualized network function creation response information to the first network device through the communications unit 1620, where the virtualized network function creation response information indicates that the creation of the virtualized network function of the target network slice instance is completed.

In this embodiment of this application, the third network device receives an indication of the first network device, to manage a creation process of the network slice instance, thereby automatically creating the network slice instance, and improving efficiency of managing the network slice instance.

It should be understood that the apparatus 1600 herein is embodied in the form of functional units. The term "unit" herein may be an application-specific integrated circuit (Application Specific Integrated Circuit, ASIC), an electronic circuit, a processor for performing one or more software or firmware programs (for example, a shared processor, a proprietary processor, or a packet processor), a memory, a combined logic circuit, and/or another appropriate component supporting the described function. In an optional example, a person skilled in the art may understand that the apparatus 1600 may be the third network device in the foregoing embodiments, and the apparatus 1600 may be configured to perform the procedures and/or steps corresponding to the third network device in the foregoing method embodiments. To avoid repetition, details are not described herein again.

Figure 17:
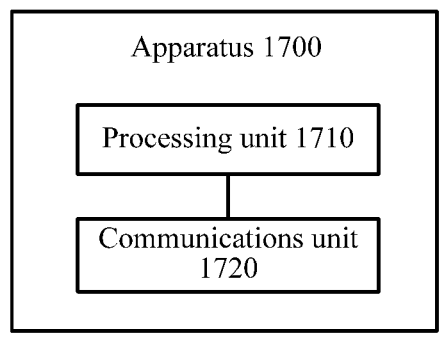
FIG. 17 is a schematic block diagram of another apparatus for managing a network slice instance according to an embodiment of this application.

FIG. 17 shows another apparatus 1700 for managing a network slice instance according to an embodiment of this application. The apparatus 1700 may be a fourth network device, and the apparatus 1700 includes a processing unit 1710 and a communications unit 1720.

The processing unit 1710 is configured to: receive, through the communications unit 1720, a virtualized network function creation request sent by a first network device, where the virtualized network function creation request is used to instruct the third network device to create a virtualized network function of a target network slice instance; and send virtualized network function creation response information to the first network device through the communications unit 1720, where the virtualized network function creation response information indicates that the creation of the virtualized network function of the target network slice instance is completed.

In this embodiment of this application, the fourth network device receives an indication of the first network device, to manage a creation process of the network slice instance, thereby automatically creating the network slice instance, and improving efficiency of managing the network slice instance.

It should be understood that the apparatus 1700 herein is embodied in the form of functional units. The term "unit" herein may be an application-specific integrated circuit (Application Specific Integrated Circuit, ASIC), an electronic circuit, a processor for performing one or more software or firmware programs (for example, a shared processor, a proprietary processor, or a packet processor), a memory, a combined logic circuit, and/or another appropriate component supporting the described function. In an optional example, a person skilled in the art may understand that the apparatus 1700 may be the fourth network device in the foregoing embodiments, and the apparatus 1700 may be configured to perform the procedures and/or steps corresponding to the fourth network device in the foregoing method embodiments. To avoid repetition, details are not described herein again.

Figure 18:
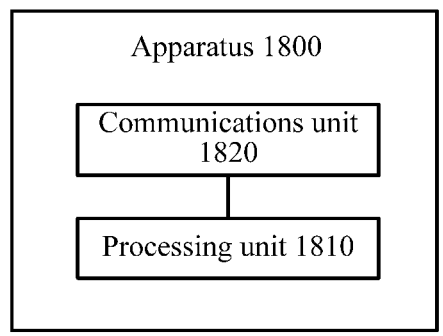
FIG. 18 is a schematic block diagram of another apparatus for managing a network slice instance according to an embodiment of this application.

FIG. 18 shows another apparatus 1800 for managing a network slice instance according to an embodiment of this application. The apparatus 1800 may be a fifth network device, and the apparatus 1800 includes a processing unit 1810 and a communications unit 1820.

The processing unit 1810 is configured to: receive, through the communications unit 1820, network function notification information sent by a first network device, where the network function notification information is used to indicate a network function to be configured by the first network device; and send network function response information to the first network device through the communications interface, where the network function response information is used to acknowledge that the fifth network device already determines the network function to be configured by the first network device.

In this embodiment of this application, the fifth network device receives an indication of the first network device, to manage a creation process of a network slice instance, thereby automatically creating the network slice instance, and improving efficiency of managing the network slice instance.

It should be understood that the apparatus 1800 herein is embodied in the form of functional units. The term "unit" herein may be an application-specific integrated circuit (Application Specific Integrated Circuit, ASIC), an electronic circuit, a processor for performing one or more software or firmware programs (for example, a shared processor, a proprietary processor, or a packet processor), a memory, a combined logic circuit, and/or another appropriate component supporting the described function. In an optional example, a person skilled in the art may understand that the apparatus 1800 may be the fifth network device in the foregoing embodiments, and the apparatus 1800 may be configured to perform the procedures and/or steps corresponding to the fifth network device in the foregoing method embodiments. To avoid repetition, details are not described herein again.

Figure 19:
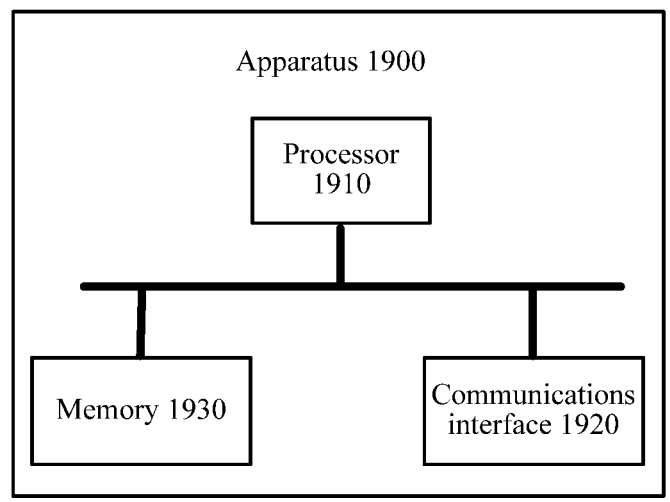
FIG. 19 is a schematic block diagram of another apparatus for managing a network slice instance according to an embodiment of this application.

FIG. 19 shows another apparatus 1900 for managing a network slice instance according to an embodiment of this application. The apparatus 1900 includes a processor 1910, a communications interface 1920, a memory 1930, and a bus system 1940. The processor 1910, the communications interface 1920, and the memory 1930 are connected to each other by using the bus system 1940. The memory 1930 is configured to store an instruction. The processor 1910 is configured to execute the instruction stored in the memory 1930, to control the communications interface 1920 to send a signal and/or receive a signal.

The processor 1910 is configured to: receive a network slice instance creation request from a transmit end device through the communications interface 1920, where the network slice instance creation request is used to request to create a target network slice instance, and the network slice instance creation request includes description information of the target network slice instance; send network function configuration indication information to a second network device through the communications interface 1920 based on the description information, where the network function configuration indication information is used to instruct the second network device to configure a network function of the target network slice instance; receive, through the communications interface 1920, network function configuration response information sent by the second network device, where the network function configuration response information indicates that the configuration of the network function of the target network slice instance is completed; and send network slice instance creation response information to the transmit end device through the communications interface 1920, where the network slice instance creation response information indicates that the creation of the target network slice instance is completed.

It should be understood that, the apparatus 1900 may be specifically the first network device in the foregoing embodiments, and may be configured to perform steps and/or procedures corresponding to the first network device in the foregoing method embodiments. Optionally, the memory 1930 may include a read-only memory and a random access memory, and provide an instruction and data to the processor. A part of the memory may further include a non-volatile random access memory. For example, the memory may further store device type information. The processor 1910 may be configured to execute the instruction stored in the memory, and when the processor 1910 executes the instruction stored in the memory, the processor 1910 is configured to perform steps and/or procedures in the method embodiments corresponding to the first network device.

Figure 20:
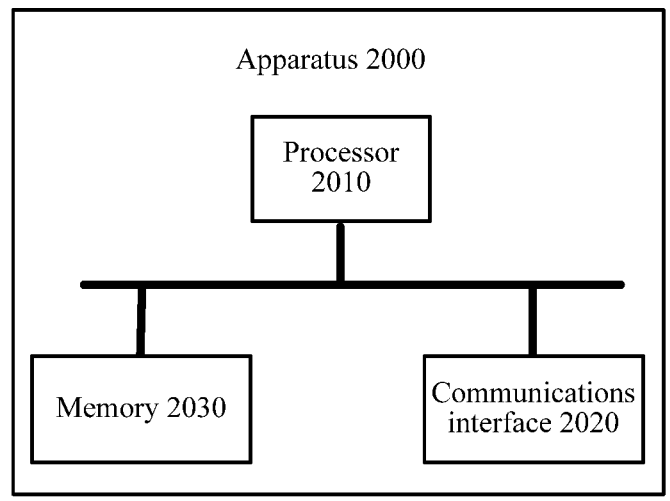
FIG. 20 is a schematic block diagram of another apparatus for managing a network slice instance according to an embodiment of this application.

FIG. 20 shows another apparatus 2000 for managing a network slice instance according to an embodiment of this application. The apparatus 2000 includes a processor 2010, a communications interface 2020, a memory 2030, and a bus system 2040. The processor 2010, the communications interface 2020, and the memory 2030 are connected to each other by using the bus system 2040. The memory 2030 is configured to store an instruction. The processor 2010 is configured to execute the instruction stored in the memory 2030, to control the communications interface 2020 to send a signal and/or receive a signal.

The processor 2010 is configured to: receive, through the communications interface 2020, network slice configuration information sent by a first network device, where the network slice configuration information is used to instruct the second network device to configure a network function of a target network slice; and send network slice configuration response information to the first network device through the communications interface 2020, where the network slice configuration response information indicates that the configuration of the network function corresponding to the target network slice is completed.

It should be understood that, the apparatus 2000 may be specifically the second network device in the foregoing embodiments, and may be configured to perform steps and/or procedures corresponding to the second network device in the foregoing method embodiments. Optionally, the memory 2030 may include a read-only memory and a random access memory, and provide an instruction and data to the processor. A part of the memory may further include a non-volatile random access memory. For example, the memory may further store device type information. The processor 2010 may be configured to execute the instruction stored in the memory, and when the processor 2010 executes the instruction stored in the memory, the processor 2010 is configured to perform steps and/or procedures in the method embodiments corresponding to the second network device.

Figure 21:
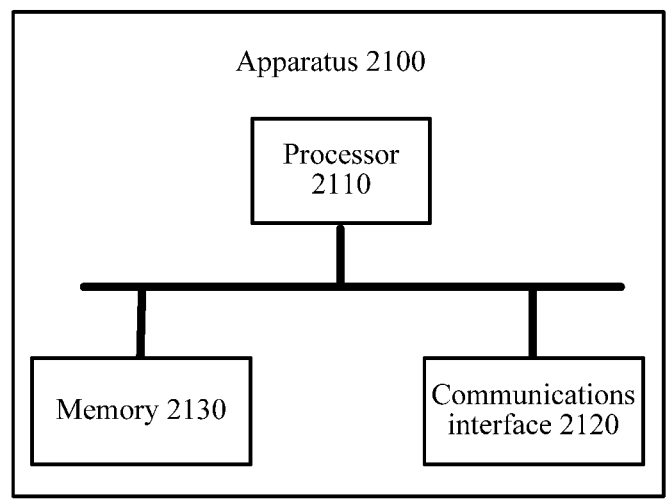
FIG. 21 is a schematic block diagram of another apparatus for managing a network slice instance according to an embodiment of this application.

FIG. 21 shows another apparatus 2100 for managing a network slice instance according to an embodiment of this application. The apparatus 2100 includes a processor 2110, a communications interface 2120, a memory 2130, and a bus system 2140. The processor 2110, the communications interface 2120, and the memory 2130 are connected to each other by using the bus system 2140. The memory 2130 is configured to store an instruction. The processor 2110 is configured to execute the instruction stored in the memory 2130, to control the communications interface 2120 to send a signal and/or receive a signal.

The processor 2110 is configured to: receive, through the communications interface 2020, a virtualized network function creation request sent by a first network device, where the virtualized network function creation request is used to instruct the third network device to create a virtualized network function of a target network slice instance; and send virtualized network function creation response information to the first network device through the communications interface 2020, where the virtualized network function creation response information indicates that the creation of the virtualized network function of the target network slice instance is completed.

It should be understood that, the apparatus 2100 may be specifically the third network device in the foregoing embodiments, and may be configured to perform steps and/or procedures corresponding to the third network device in the foregoing method embodiments. Optionally, the memory 2130 may include a read-only memory and a random access memory, and provide an instruction and data to the processor. A part of the memory may further include a non-volatile random access memory. For example, the memory may further store device type information. The processor 2110 may be configured to execute the instruction stored in the memory, and when the processor 2110 executes the instruction stored in the memory, the processor 2110 is configured to perform steps and/or procedures in the method embodiments corresponding to the third network device.

Figure 22:
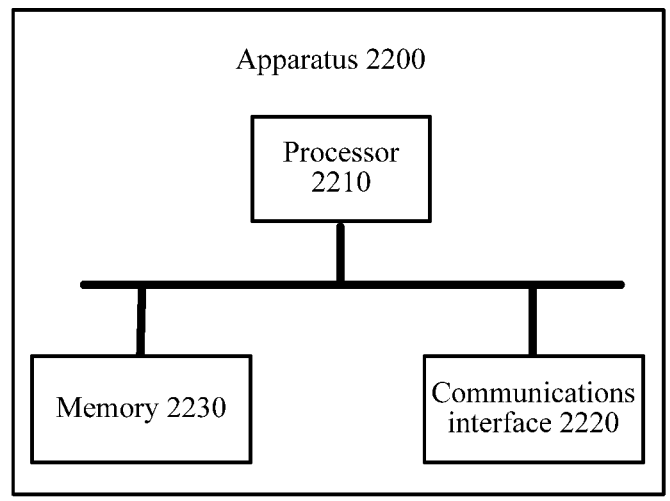
FIG. 22 is a schematic block diagram of another apparatus for managing a network slice instance according to an embodiment of this application.

FIG. 22 shows another apparatus 2200 for managing a network slice instance according to an embodiment of this application. The apparatus 2200 includes a processor 2210, a communications interface 2220, a memory 2230, and a bus system 2240. The processor 2210, the communications interface 2220, and the memory 2230 are connected to each other by using the bus system 2240. The memory 2230 is configured to store an instruction. The processor 2210 is configured to execute the instruction stored in the memory 2230, to control the communications interface 2220 to send a signal and/or receive a signal.

The processor 2210 is configured to: receive, through the communications interface 2220, a resource allocation request sent by a first network device, where the resource allocation request is used to request the fourth network device to allocate a network resource corresponding to a virtualized network function to the target network slice instance; and send resource allocation response information to the first network device through the communications interface 2220, where the resource allocation response information is used to indicate that the allocation of the network resource corresponding to the virtualized network function of the target network slice instance is completed.

It should be understood that, the apparatus 2200 may be specifically the third network device in the foregoing embodiments, and may be configured to perform steps and/or procedures corresponding to the third network device in the foregoing method embodiments. Optionally, the memory 2230 may include a read-only memory and a random access memory, and provide an instruction and data to the processor. A part of the memory may further include a non-volatile random access memory. For example, the memory may further store device type information. The processor 2210 may be configured to execute the instruction stored in the memory, and when the processor 2210 executes the instruction stored in the memory, the processor 2210 is configured to perform steps and/or procedures in the method embodiments corresponding to the third network device.

Figure 23:
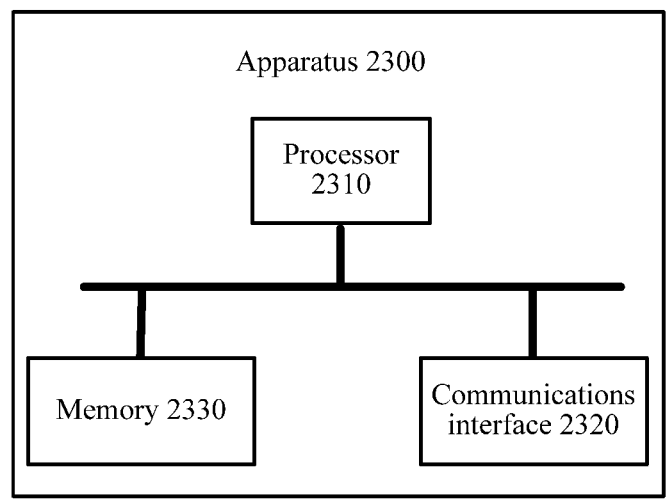
FIG. 23 is a schematic block diagram of another apparatus for managing a network slice instance according to an embodiment of this application.

FIG. 23 shows another apparatus 2300 for managing a network slice instance according to an embodiment of this application. The apparatus 2300 includes a processor 2310, a communications interface 2320, a memory 2330, and a bus system 2340. The processor 2310, the communications interface 2320, and the memory 2330 are connected to each other by using the bus system 2340. The memory 2330 is configured to store an instruction. The processor 2310 is configured to execute the instruction stored in the memory 2330, to control the communications interface 2320 to send a signal and/or receive a signal.

The processor 2310 is configured to: receive, through the communications interface 2320, network function notification information sent by a first network device, where the network function notification information is used to indicate a network function to be configured by the first network device; and send network function response information to the first network device through the communications interface 2320, where the network function response information is used to acknowledge that the fifth network device already determines the network function to be configured by the first network device.

It should be understood that, the apparatus 2300 may be specifically the fifth network device in the foregoing embodiments, and may be configured to perform steps and/or procedures corresponding to the fifth network device in the foregoing method embodiments. Optionally, the memory 2330 may include a read-only memory and a random access memory, and provide an instruction and data to the processor. A part of the memory may further include a non-volatile random access memory. For example, the memory may further store device type information. The processor 2310 may be configured to execute the instruction stored in the memory, and when the processor 2310 executes the instruction stored in the memory, the processor 2310 is configured to perform steps and/or procedures in the method embodiments corresponding to the fifth network device.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

Additionally, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. Additionally, the character "/" in this specification generally indicates an "or" relationship between the associated objects.

It should be understood that in the embodiments of this application, "B corresponding to A" indicates that B is associated with A, and B may be determined according to A. However, it should be further understood that determining B according to A does not mean that B is determined according to A only, that is, B may also be determined according to A and/or other information.

A person of ordinary skill in the art may be aware that, the units and algorithm steps in the examples described with reference to the embodiments disclosed herein may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. Additionally, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments of this application.

Additionally, the function units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

To make the application document brief and clear, technical features and descriptions in one of the foregoing embodiments may be considered to be applicable to other embodiments, and details are not described in the other embodiments.

The foregoing descriptions are merely specific implementations of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
receiving, by a first network device, a network slice instance creation request from a transmit end device, wherein the network slice instance creation request requests to create a target network slice instance, and the network slice instance creation request comprises description information of the target network slice instance;
determining, by the first network device, a network function for the target network slice instance based on the description information of the target network slice instance;
in response to the network function being a virtualized network function, instructing, by the first network device, a third network device to create the network function;
sending, by the first network device after creation of the network function, network function configuration indication information to a second network device based on the description information, wherein the network function configuration indication information instructs the second network device to configure the network function of the target network slice instance;
receiving, by the first network device, network function configuration response information sent by the second network device, wherein the network function configuration response information indicates that configuration of the network function of the target network slice instance is completed; and
sending, by the first network device, network slice instance creation response information to the transmit end device, wherein the network slice instance creation response information indicates that creation of the target network slice instance is completed.

2. The method according to claim 1, wherein the the target network slice instance comprises one or more physical network functions or one or more virtualized network functions.

3. The method according to claim 1, wherein, when the network function of the target network slice instance comprises a sharable network function, the network function configuration indication information comprises an identifier of the target network slice instance.

4. The method according to claim 1, wherein, when the network function of the target network slice instance comprises a sharable network function, the method further comprises:
sending, by the first network device, a network resource extension indication to a fourth network device, wherein the network resource extension indication is used to instructs the fourth network device to allocate a network resource to the shared network function of the target network slice instance.

5. The method according to claim 1, wherein the method further comprises:
sending, by the first network device, resource reservation indication information to a fourth network device, wherein the resource reservation indication information is used to instructs the fourth network device to reserve a network resource for the target network slice instance.

6. The method according to claim 1, wherein the method further comprises:
sending, by the first network device, a virtualized network function creation request to the third network device, wherein the virtualized network function creation request instructs the third network device to create the virtualized network function of the target network slice instance; and
receiving, by the first network device, virtualized network function creation response information sent by the third network device, wherein the virtualized network function creation response information indicates that creation of the virtualized network function of the target network slice instance is completed.

7. The method according to claim 6, wherein the method further comprises:
sending, by the first network device, a resource allocation request to a fourth network device, wherein the resource allocation request requests the fourth network device to allocate a network resource corresponding to the virtualized network function of the target network slice instance; and
receiving, by the first network device, resource allocation response information sent by the fourth network device, wherein the resource allocation response information indicates that allocation of the network resource corresponding to the virtualized network function of the target network slice instance is completed.

8. The method according to claim 7, wherein the method further comprises:
after the receiving, by the first network device, the resource allocation response information sent by the fourth network device:
sending, by the first network device, resource allocation acknowledgement information to the third network device, wherein the resource allocation acknowledgement information indicates that the allocation of the network resource corresponding to the virtualized network function of the target network slice instance is completed.

9. The method according to claim 1, wherein the method further comprises:
sending, by the first network device, network function notification information to a fifth network device, wherein the network function notification information indicates the network function to be configured by the first network device; and
receiving, by the first network device, network function response information sent by the fifth network device, wherein the network function response information indicates that the fifth network device has already determined the network function to be configured by the first network device.

10. The method according to claim 1, wherein the method further comprises:
sending, by the first network device, network function query information to a fifth network device, wherein the network function query information to requests to query for the network function that is already generated by the fifth network device; and
receiving, by the first network device, network function feedback information sent by the fifth network device, wherein the network function feedback information to indicates the network function that is already generated by the fifth network device.

11. The method according to claim 1, wherein the description information comprises at least one of: service requirement description information of a service requirement of the target network slice instance or configuration parameter information of a network slice template of the target network slice instance.

12. An apparatus for managing a network slice instance, wherein the apparatus is a first network device, and comprises:
a communications interface;
a memory, configured to store instructions;
at least one processor, connected to the memory and the communications interface, and configured to execute the instructions stored in the memory, to cause the apparatus to perform operations, the operations comprising:
receiving a network slice instance creation request from a transmit end device through the communications interface, wherein the network slice instance creation request requests to create a target network slice instance, and the network slice instance creation request comprises description information of the target network slice instance;
determining a network function for the target network slice instance based on the description information of the target network slice instance;
in response to the network function being a virtualized network function, instructing a third network device to create the network function;
sending, after creation of the network function, network function configuration indication information to a second network device through the communications interface based on the description information, wherein the network function configuration indication information instructs the second network device to configure the network function of the target network slice instance;
receiving, through the communications interface, network function configuration response information sent by the second network device, wherein the network function configuration response information indicates that configuration of the network function of the target network slice instance is completed; and
sending network slice instance creation response information to the transmit end device through the communications interface, wherein the network slice instance creation response information indicates that creation of the target network slice instance is completed.

13. The apparatus according to claim 12, wherein the target network slice instance comprises one or more physical network functions or one or more virtualized network functions.

14. The apparatus according to claim 12, wherein, function of the target network slice instance comprises a sharable network function, the network function configuration indication information comprises an identifier of the target network slice instance.

15. The apparatus according to claim 12, wherein, when the network function of the target network slice instance comprises a sharable network function, the operations further comprising:
sending a network resource extension indication to a fourth network device through the communications interface, wherein the network resource extension indication instructs the fourth network device to allocate a network resource to the shared network function of the target network slice instance.

16. The apparatus according to claim 12, the operations further comprising:

sending resource reservation indication information to a fourth network device through the communications interface, wherein the resource reservation indication information instructs the fourth network device to reserve a network resource for the target network slice instance.

17. The apparatus according to claim 12, wherein the operations further comprising:
   sending a virtualized network function creation request to the third network device through the communications interface, wherein the virtualized network function creation request instructs the third network device to create the virtualized network function of the target network slice instance; and
   receiving, through the communications interface, virtualized network function creation response information sent by the third network device, wherein the virtualized network function creation response information indicates that creation of the virtualized network function of the target network slice instance is completed.

18. The apparatus according to claim 17, the operations further comprising:
   sending a resource allocation request to a fourth network device through the communications interface, wherein the resource allocation request requests the fourth network device to allocate a network resource corresponding to the virtualized network function of the target network slice instance; and
   receiving, through the communications interface, resource allocation response information sent by the fourth network device, wherein the resource allocation response information indicates that allocation of the network resource corresponding to the virtualized network function of the target network slice instance is completed.

19. The apparatus according to claim 18, the operations further comprising:
   after the receiving the resource allocation response information sent by the fourth network device:
      send resource allocation acknowledgement information to the third network device through the communications interface, wherein the resource allocation acknowledgement information indicates that the allocation of the network resource corresponding to the virtualized network function of the target network slice instance is completed.

20. The apparatus according to claim 12, the operations further comprising:
   sending network function notification information to a fifth network device through the communications interface, wherein the network function notification information indicates the network function to be configured by the first network device; and
   receiving, through the communications interface, network function response information sent by the fifth network device, wherein the network function response information indicates that the fifth network device has already determined the network function to be configured by the first network device.

* * * * *

UNITED STATES PATENT AND TRADEMARK OFFICE
CERTIFICATE OF CORRECTION

Page 1 of 1

PATENT NO. : 11,032,214 B2
APPLICATION NO. : 16/400687
DATED : June 8, 2021
INVENTOR(S) : Sun et al.

It is certified that error appears in the above-identified patent and that said Letters Patent is hereby corrected as shown below:

In the Claims

Claim 4, Column 46; Lines 57 and 58 delete "is used to"

Claim 5, Column 46; Lines 65 and 66 delete "is used to"

Claim 10, Column 47; Lines 58 delete "to"

Claim 10, Column 47; Lines 63 delete "to"

Claim 14, Column 48; Lines 51 and 52 delete "wherein, function" insert --wherein, where the network function--

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*